United States Patent [19]
Lumpkin et al.

[11] Patent Number: 5,935,220
[45] Date of Patent: Aug. 10, 1999

[54] APPARATUS AND METHOD FOR HIGH SPEED DATA AND COMMAND TRANSFER OVER AN INTERFACE

[75] Inventors: Todd Wayne Lumpkin, Huntsville; Timothy Lee Williams, Harvest, both of Ala.

[73] Assignee: Motorola Inc., Schaumburg, Ill.

[21] Appl. No.: 08/694,552

[22] Filed: Aug. 9, 1996

[51] Int. Cl.[6] .................................................. G06F 13/00
[52] U.S. Cl. ..................... 710/5; 710/8; 710/48; 710/49
[58] Field of Search ............... 395/200.42, 500, 395/849, 200.8, 310, 872, 825, 309; 370/464; 711/147; 364/491; 710/5, 8, 48, 49

[56] References Cited

U.S. PATENT DOCUMENTS

| | | | |
|---|---|---|---|
| 3,976,979 | 8/1976 | Parkinson et al. | 395/500 |
| 4,156,907 | 5/1979 | Rawlings et al. | 395/200.42 |
| 4,792,896 | 12/1988 | Maclean et al. | 395/500 |
| 5,019,966 | 5/1991 | Saito et al. | 395/849 |
| 5,058,110 | 10/1991 | Beach et al. | 370/464 |
| 5,307,459 | 4/1994 | Petersen et al. | 395/200.8 |
| 5,375,219 | 12/1994 | Okabe | 711/147 |
| 5,386,518 | 1/1995 | Reagle et al. | 395/310 |
| 5,412,782 | 5/1995 | Hausman et al. | 395/200.8 |
| 5,561,823 | 10/1996 | Anderson | 395/872 |
| 5,768,617 | 6/1998 | Liu | 395/825 |
| 5,784,291 | 7/1998 | Chen et al. | 364/491 |
| 5,790,831 | 8/1998 | Lin et al. | 395/500 |
| 5,848,253 | 12/1998 | Walsh et al. | 395/309 |

*Primary Examiner*—Wayne Amsbury
*Assistant Examiner*—Thuy Pardo
*Attorney, Agent, or Firm*—Joanne N. Pappas

[57] ABSTRACT

The apparatus and method for high speed data and command transfer over an interface (202), such as an ISA or PCMCIA bus or interface, includes a transceiver (206) and a processor (210) having a direct memory access (DMA) controller (240), a memory (211) for storage of data, and a channel interface (218) for connection to a communications channel. The processor (210) is responsive through a set of program instructions, such as software or firmware, to receive an interrupt signal (310, 315) and, when the interrupt signal indicates a write command (320, 330), to transfer data via the transceiver from the interface to the memory for transmission over the communications channel (335), and when the interrupt signal indicates data received from the communications channel (350), the processor further responsive to generate a read command and transfer data from the memory to the interface via the transceiver (355).

32 Claims, 15 Drawing Sheets

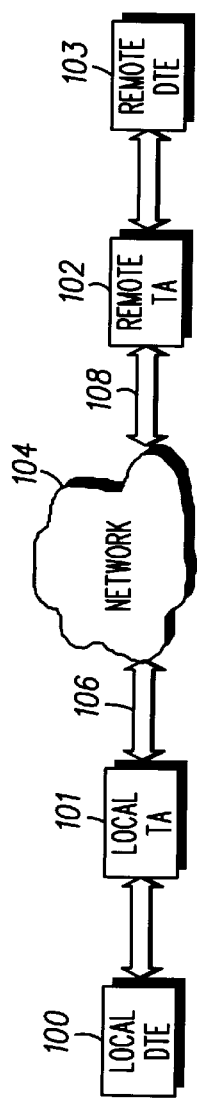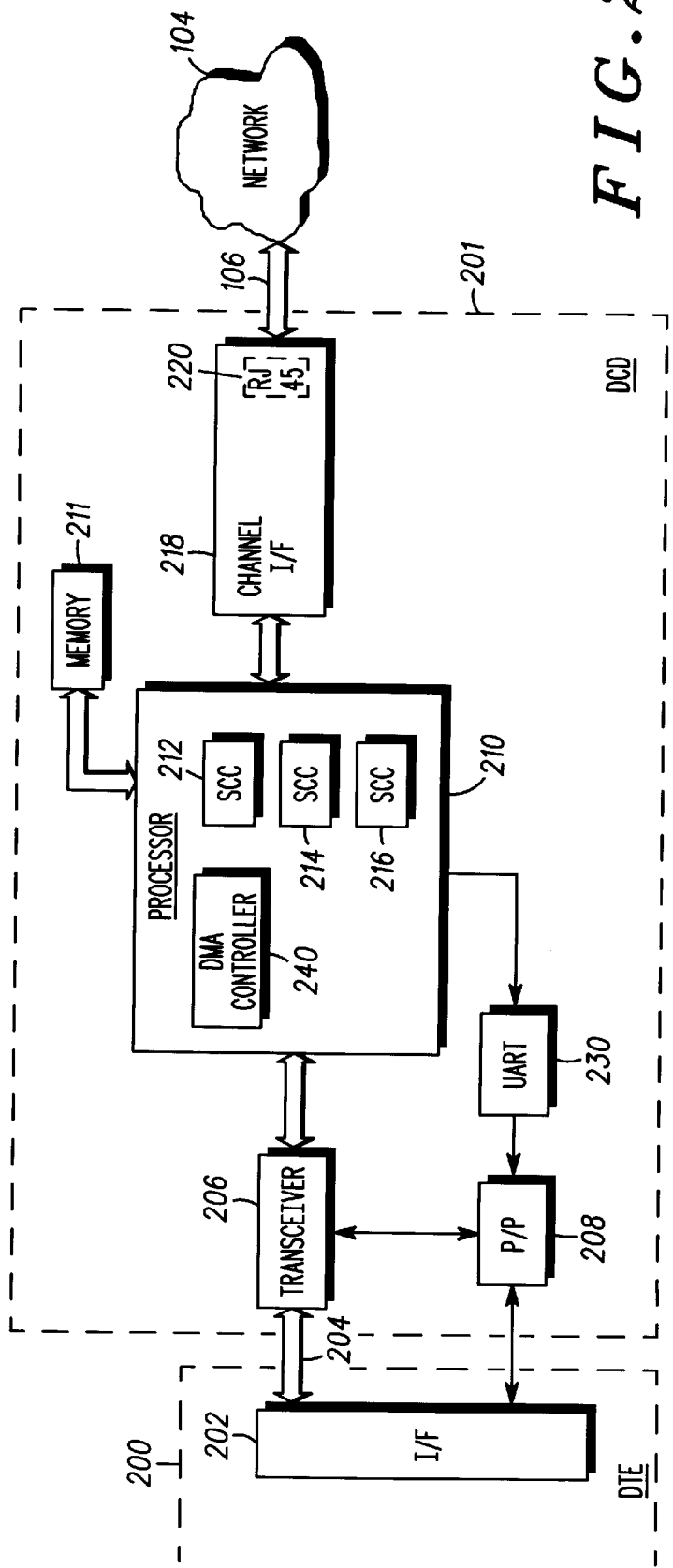

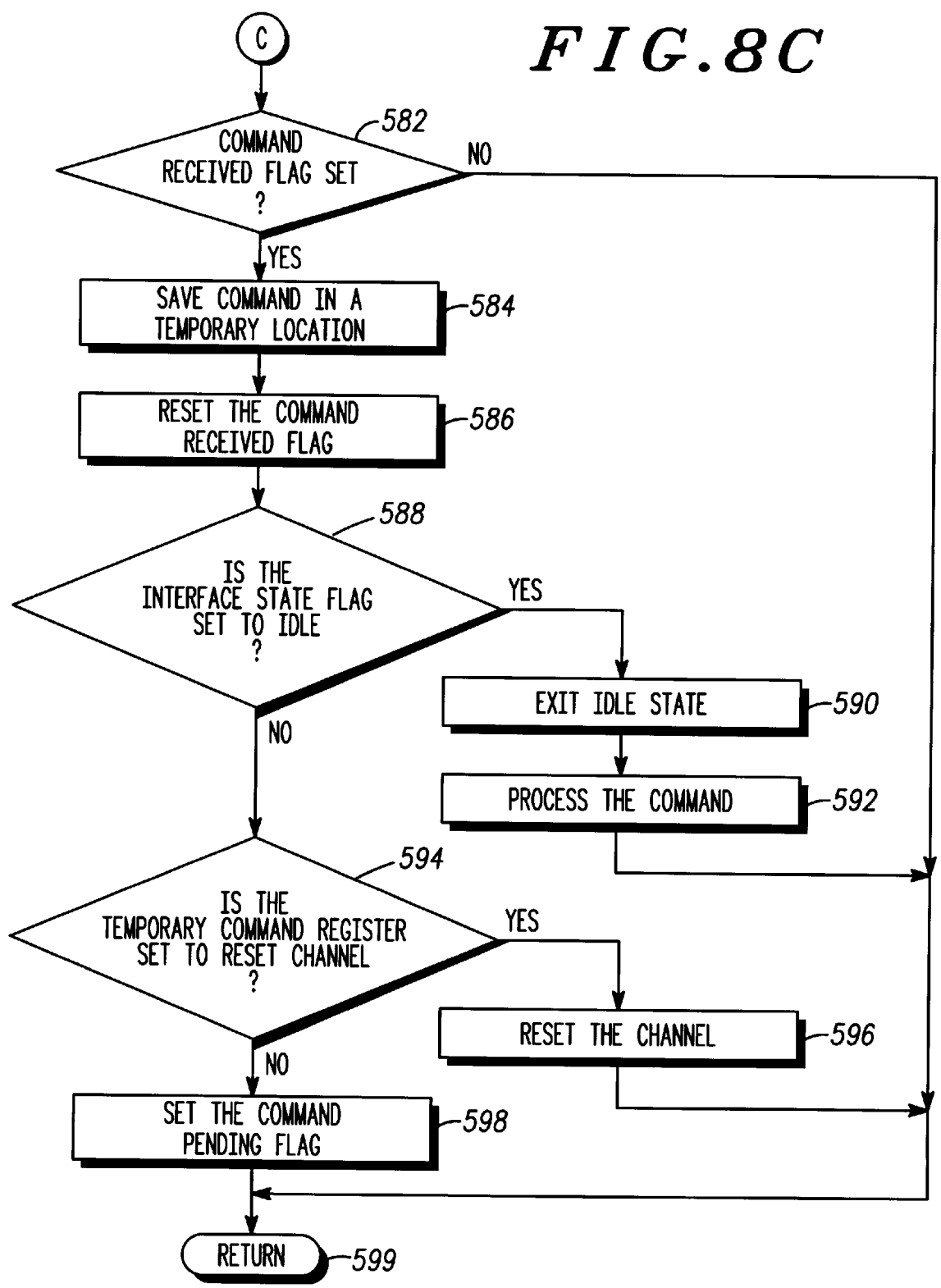

APPARATUS AND METHOD FOR HIGH SPEED DATA AND COMMAND TRANSFER OVER AN INTERFACE

FIELD OF THE INVENTION

This invention relates in general to data communications devices and, more specifically, to an apparatus and method for high speed data and command transfer over an interface, such as a computer bus, for applications such as data transmission.

BACKGROUND OF THE INVENTION

Presently, a major portion of point-to-point data communication between data terminal equipment ("DTEs" or terminals), such as personal computers and workstations, is implemented using data communications devices ("DCDs"), such as analog modems, digital modems, and ISDN terminal adapters. Most such data communications is currently over analog communications systems, such as the public switched telephone network ("PSTN"). Currently, the fastest high-speed analog modems operate at data transfer rates of approximately 28.8 kbps (kilobits per second) to over 30 kbps.

A variety of desirable applications, such as videoconferencing, downloading data files from various networks, and transmitting documents or other data to various networks or other DTEs, may require higher speeds of data transmission than is currently practicable, affordable, or available over most analog PSTN systems. Such higher speeds for data transmission may also be preferrable for consumers, as slower data speeds may result in delays which are perceived as commercially unacceptable. Accordingly, many telecommunication providers have begun to offer and to implement various digital and other high speed data transmission services to meet the corresponding demand for greater data transmission capability, higher data transfer rates, and greater data transmission bandwidth, such as switched digital services, T1 services, E1 services, Integrated Services Digital Networks ("ISDN"), and the emerging Motorola CableComm™ system utilizing hybrid fiber coaxial cable. A typical T1 connection has a data rate of 1.544 Mbps (megabits per second), which is further time division multiplexed ("TDM") into digital (not analog) transmission channels. The T1 connection comprises 24 channels, with each channel referred to as a DS0 having a data rate of 64,000 bps. The emerging Motorola Cable-Comm™ system may have data transmission rates as high as 30 Mbps. Specifications and standards for ISDN, T1, and E1 services are described in numerous International Telecommunications Union ("ITU") Recommendations, such as Recommendation G (for T1, E1), and the I-Series Recommendation (for ISDN). Other discussions of analog and digital telecommunications services may be found in a wide variety of references, such as R. Freeman, *Reference Manual for Telecommunication Engineers*, John Wiley & Sons, 1985.

For ISDN, a typical ISDN Basic Rate Interface ("BRI") service currently available to end users consists of three time division multiplexed channels, comprising two DS0s known as B channels operating at 64 kbps and one D channel operating at 16 kbps. The B channels may be used for transmission of voice, video, multimedia, and other data and information (individually and collectively referred to herein as "data"), while a D channel may be used for packetized data and/or control information (i.e., call set-up and shut down), with additional bandwidth utilized for framing, synchronization, and other overhead bits. A DCD such as an ISDN terminal adapter ("TA") may be used for transferring data between DTEs (such as personal computers, terminals, local area networks, video conferencing equipment and similar equipment) using such ISDN service. While two B (data) channels (each operating at 64 kbps) are sufficient for many applications, there are applications in which one data channel having a higher data bandwidth is preferable. As a consequence, a process known as "bonding" (Bandwidth ON Demand) has evolved, in which two or more channels (each having lesser bandwidth) are concatenated or combined into one channel having having greater bandwidth. For example, it may be desirable to combine the two, 64 kbps B channels to obtain a single bonded channel operating at 128 kbps. The 128 kbps channel formed by bonding may then be used to transfer data between two DTEs. Depending upon the service provider, additional DS0s may also be combined to create channels operating at even higher data rates. In addition, higher data rates are or will be available with other communication systems, such as the emerging Motorola CableComm™ system mentioned above.

Various difficulties with operation at these higher data rates, however, may arise from the typical, standard hardware and software resident in DTEs such as personal computers ("PCs"), servers, routers, bridges, and other computer and communication networking equipment. For example, for a personal computer, data transfer typically occurs across a 16 bit peripheral interface or bus, such as the Industry Standard Architecture bus commonly known and referred to as an "ISA" bus, or across another standardized bus or interface format known as a PCMCIA (Personal Computer Memory Card International Association) bus or interface. Data is transferred between the PC and a connected TA (stand alone or internal PC card), for ISDN or other digital transmission, via an ISA or PCMCIA bus or interface. Typical terminal adapters and other data communications devices have employed Universal Asynchronous Receiver Transmitters ("UARTs") for serial data transmission and reception over an ISA bus or other interface. In addition, many data communications applications programs, such as those utilizing a Windows® operating system, have been developed presuming that the underlying hardware will include a UART for data transfer and, accordingly, utilize drivers (software drivers) designed for UARTs. Most UARTs, however, are only capable of a maximum data transmission speed of 115.2 kbps, which is acceptable for most applications, but cannot be used to take full advantage, for example, of bonded ISDN channels operating at 128 kbps or or other communication media or network connections operating at even higher data rates. Use of other UARTs, which may operate at higher data rates, may be prohibitively expensive for inclusion in terminal adapters or other data communications devices, and, again, may also be insufficient for very high speed transmission (such as that available over several bonded channels). As a consequence, in digital communications systems, use of a typical UART within a data communications device may create an unwanted "bottleneck" situation, slowing down data transmission in circumstances where higher data transmission rates are otherwise possible and desirable.

Accordingly, a need has remained for an apparatus and method to provide for higher speed data transmission over communication interfaces or busses, such as ISA busses, in order to utilize the full transmission capability which may be available over digital or other communication systems. In addition, a need has remained to provide for such higher speed data transmission cost effectively and with ease of manufacture. Lastly, a need had remained to provide for such higher speed data transmission either utilizing or retrofittable with existing computer architecture and operating systems, such as the Macintosh® and the various Windows® operating systems for personal computers.

BRIEF DESCRIPTION OF THE DRAWINGS

FIG. 1 is a block diagram illustrating the use of terminal adapters to transmit data over a communications network.

FIG. 2 is a block diagram illustrating a data communications device in accordance with the present invention.

DETAILED DESCRIPTION OF THE INVENTION

Figure 3:
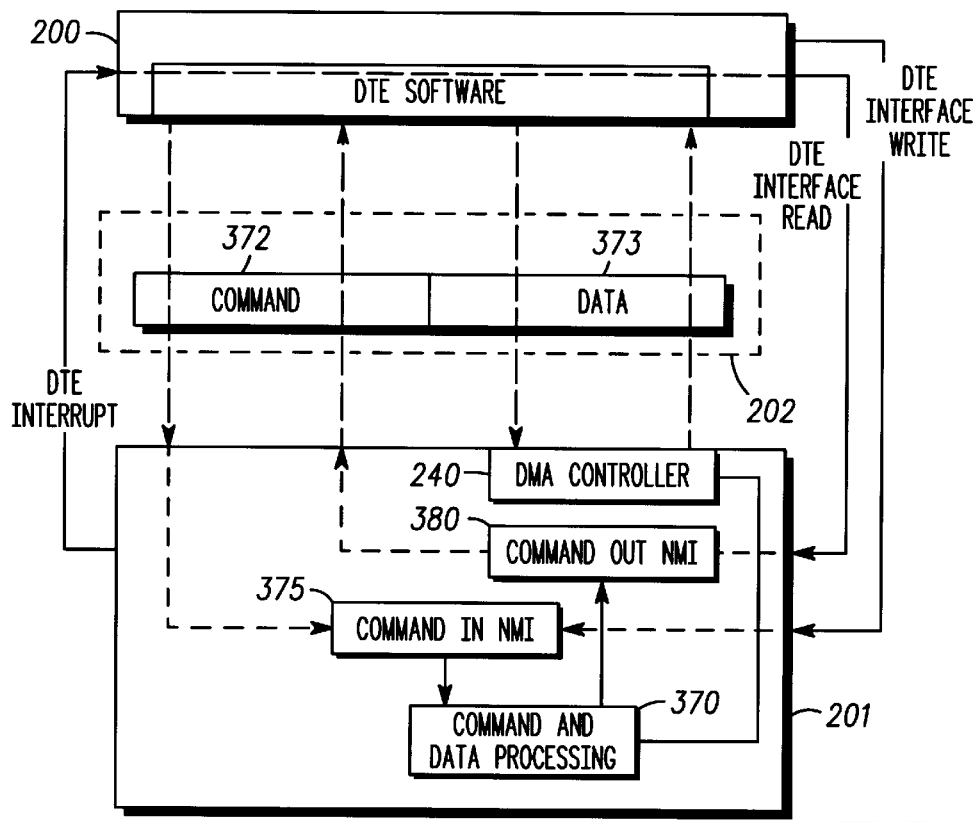
FIG. 3 is a high level firmware state diagram for high speed data transfer across an interface in accordance with the present invention.

The apparatus and method of the present invention provides for higher speed data transmission over communication interfaces or busses, such as ISA or PCMCIA busses, and enables data communications devices and equipment to utilize the full transmission capability which may be available over digital or other communication network systems. The apparatus of the present invention utilizes a transceiver for parallel transmission across an interface, such as an ISA or PCMCIA bus, and utilizes a processor operating with a set of program instructions to control the transfer of data across the interface. In addition, the apparatus and method of the present invention provides for such higher speed data transmission in a way which is compatible with existing computer architecture and operating systems, such as the Macintosh® and the various Windows® operating systems for personal computers.

FIG. 1 is a block diagram which illustrates the use of terminal adapters to transmit data over a communications network. As shown in FIG. 1, local data terminal equipment (DTE) 100, such as computer, is coupled to a local terminal adapter 101. The local terminal adapter 101 is coupled via a (digital) communications channel 106 to a digital network (or "network") 104, such as an ISDN network. The digital communications channel 106 may be comprised of one or more standard digital lines, such as T1, E1, or ISDN, which transmit a digital signal. As shown in FIG. 1, remote DTE 103, which may also be a computer, is coupled to a remote terminal adapter 102, which is also coupled to the network 104 through a (digital) communications channel 108, which also may be comprised of one or more standard digital lines, such as T1, E1, or ISDN, which transmit a digital signal. As indicated in FIG. 1, the local DTE 100 and local terminal adapter 101 are arranged to transfer data and other information and signals, between a remote DTE 103 having a remote terminal adapter 102, over the digital network 104. Data, including information and command signals, are transferred between the DTEs and their respective terminal adapters over various interfaces or connections, such as an ISA or PCMCIA bus. Information from the local DTE 100 or remote DTE 103 is formatted or processed (by their respective terminal adapters 101 and 102) to form a digital signal such as, for example, a DS0 format digital signal, which is then transmitted to the network 104, for example, at a rate of 64 kbps. If additional digital channels are utilized, for example, bonded B channels in an ISDN environment, the digital signal may be transmitted at a rate of 128 kbps. The transmission rate may be even higher with the incorporation or bonding of additional channels, such as additional DS0s, or through use of other higher rate communication systems mentioned above. The receiving terminal adapters (i.e., the corresponding remote terminal adapter 102 and/or local terminal adapter 101) decode the received digital signal and transmit the decoded data to, respectively, the remote DTE 103 and the local DTE 100.

FIG. 2 is a block diagram illustrating a data communications device ("DCD") 201 in accordance with the present invention. The operation of the data communications device 201 is described in greater detail below with reference to FIGS. 3–18. Referring to FIG. 2, the data communications device 201, such as an ISDN or other digital network terminal adapter, or other data or computer networking or communications device, is coupled or connected to a DTE 200, such as a personal computer or workstation, through an interface (or bus) 202, such as an ISA bus or PCMCIA bus in the preferred embodiment, via interface connections 204. Alternatively, the data communications device 201 may also be within the DTE 200, for example, embodied on a PC card, and also communicates with the logic board of the DTE 200 via an interface (or bus) 202. In the preferred embodiment, the interface 202 is a 16-bit ISA bus, and the interface connections 204 also provide for 16 bit connections. As used herein, the interface 202 is also referred to as a first interface (to disctinguish it from a second interface referred to as a communications channel interface 218 which is also illustrated in FIG. 2). Coupleable to the interface 202 (via the interface connections 204) is a transceiver 206, which is capable of bidirectional data transfer (both transmission and reception) between the interface 202 and a processor 210. In the preferred embodiment, the transceiver 206 is a parallel transceiver having a multiple bit capacity (of 16 bits) corresponding to the bit capacity of the first interface 202 (such as a 16 bit ISA bus), and is implemented utilizing two 8-bit transceiver 74HCT245 integrated circuits, which are manufactured by a variety of sources, including Motorola, Inc., Philips, and Advanced Micro Devices, Inc. Use of the transceiver 206 and processor 210, in the preferred embodiment, in conjunction with the methodology discussed in greater detail below with reference to FIGS. 3 through 18, provides for 16 bit parallel data transmission and reception across an interface 202 such as an ISA or similar bus, at a high data rate, rather than having the data communications device limited to a slower data rate of serial data transmission and reception via serial transmit and receive lines of a UART. Continuing to refer to FIG. 2, also connected to the transceiver 206, and coupleable to the interface 202, in the preferred embodiment, is a "plug and play" integrated circuit 208, such as a Fujitsa 886701, to provide appropriate addressing and identification for the interface 202. Such addressing and identification may also be provided in other ways, for example, through IRQ and address select lines or switches known in prior art. Connected to the transceiver 206 is a processor 210, such as a Motorola M68302 integrated multiprotocol processor, which also typically contains a DMA controller 240 and three serial communications controllers ("SCCs") 212, 214 and 216. In the preferred embodiment, the output pins from the SCCs, SCC 212, SCC 214 and SCC 216, are connected to another, second interface, namely, a communications channel interface 218, such as a Motorola ISDN U interface MC145572. The communications channel interface 218 is coupleable to a communications channel 106 for communication with a (digital) network 104 (or other similar communications network), which may be an ISDN, T1 or E1 network, through a jack arrangement 220, such as an RJ45 jack. Also coupled to or embodied within the processor 210 is a memory 211, utiized to store data for transmission over the communications channel 106 and also to store data received from the communications channel 106. Not illustrated in FIG. 2, in the preferred embodiment, the processor 210 also may be coupled to analog telecommunications network interface circuitry through SLIC (subscriber loop interface circuit) circuits which typically performs the functions of a codec, a dual tone multifrequency (DTMF) encoder and decoder, and performs supervision functions (such as hook status) and other BORSHT functions. The preferred embodiment of the data communications device 201 may also include, as an option, a UART 230 (such as an Advanced Micro Devices 16450 or 16550) connected between the processor 210 and the "plug and play" integrated circuit 208.

As discussed in greater detail below, the apparatus and method for high speed data transfer over a bus, in accordance with the present invention, primarily involve the transceiver 206 and the processor 210 (with its components, such as a DMA controller 240 of a Motorola M68302 integrated multiprotocol processor). The processor 210 may be programmed, through a set of program instructions, to execute the methodology illustrated in the firmware diagram of FIG. 3 and the flow charts of FIGS. 4–18, such as directing the DMA controller 240 (via the transceiver 206) to transfer data onto the interface 202 (to be read by the DTE 200) and to transfer data from the interface 202 (written by the DTE 200). Reference to the method or methodology of the present invention also should be understood to mean and include execution of the method or methodology by the processor 210 (in conjunction with the transceiver 206) in accordance with a set of program instructions.

In the preferred embodiment, the methodology is performed during interrupt services routines, utilizing nonmaskable and maskable interrupts. Various interface status flags (also referred to as interface states or interface state parameters) are also utilized, to avoid potentially incompatible directives which, for example, might otherwise cause inappropriate changes of state during the execution of particular steps, such as causing an unwanted interruption during reading from or writing to the interface 202. These various status flags (interface state parameters) are maintained as a set of variables stored in memory 211 which may be set to particular values, such as true/false, on/off, 1/0, to indicate the state or status of the interface 202. For example, in the preferred embodiment, the interface 202 has "idle" and "non-idle" states, such that the interface 202 is referred to as being in an idle state or is idle, with respect to the invention only, insofar as the interface 202, at that time, is not directly involved with the actual transfer of data, such as when the processor 210 is waiting for a command or an interrupt, or is performing other tasks or operations (which may not directly involve the actual transfer of data across the interface 202 at that time).

As indicated above, within the processor 210 is a DMA (direct memory access) controller 240, which also may be referred to as an IDMA (independent direct memory access) controller. Within the processor 210, the DMA controller 240 is utilized to transfer information between a peripheral, such as memory 211 within the data communications device 201, and the interface 202, via the transceiver 206. The memory 211 may typically include memory buffers, for data to be queued for transmission or reception. Additional information concerning the functions of a DMA controller 240 may be found in various reference manuals, such as the Motorola MC68302 User's Manual.

FIG. 3 is a high level firmware state diagram, representing how the hardware and software elements are integrated, for high speed data transfer across an interface 202 in accordance with the present invention. The interface 202 may be conceptualized as having two registers, a command register 372 and a data register 373; note, however, that this is a logical or conceptual division only, as both registers are actually the same physical, preferably 16 bit interface 202. All transfers of information across the interface 202 are also under the control of driver software within the DTE 200, implemented in accordance with the methodology of the present invention. A DTE input-output (I/O) write to one of these registers causes the data communications device 201 to read from the respective register. A DTE input-output (I/O) read to one of these registers causes the data communications device 201 to write to the respective register. It should be noted that the terms read and write are relative to either the DTE 200 or the DCD 201 and, as a consequence, a data transfer from the DTE 200 to the DCD 201 (for transmission over the communications channel 106) is referred to herein as a DTE write, while a data transfer from the DCD 201 to the DTE 200 (of data received from the communications channel 106) is referred to herein as a DTE read.

Continuing to refer to FIG. 3, a DTE (or PC) interrupt is a mechanism used by the data communications device 201 to indicate to the DTE 200 that a command is waiting to be read by the DTE 200 (and this DTE interrupt mechanism can be disabled for certain commands). Similarly, various commands from the DTE 200 to the DCD 201 are (or cause) interrupts to the processor 210 of the DCD 201. A DTE interface read from the command register 372 into the DTE 200 causes an interrupt to the processor 210 of the data communications device 201. A DTE interface write from the DTE 200 into the command register 372 causes an interrupt to the processor 210 of the data communications device 201. Data reads and writes across the data register 373 of the interface 202 are accomplished by the DMA controller 240 within the processor 210 of the data communications device 201 (rather than the DTE 200), and may occur in the absence of interrupt signals.

As indicated above, depending upon the type of command, the interrupts to and from the DCD 201 may or may not be maskable, i.e., disabled. In the preferred embodiment, commands out (from the DCD 201 to the DTE 200) and commands in (from the DTE 200 to the DCD 201) are non-maskable interrupts ("NMIls"). Other interrupts, such as a secondary interrupt (generated by a NMI), a DTE read DMA complete, a DTE write DMA complete, a network communication interrupt, and a periodic interrupt (for state monitoring), are maskable, and may be disabled.

Continuing to refer to FIG. 3, a DTE read from or write to the data register 373 will generate a DMA transfer (read or write) request (command) to the DMA controller 240 of the data communications device 201. The DMA controller 240, having been previously configured based upon the contents of a command word (as discussed in greater detail below with reference to FIGS. 12 and 15), will transfer a 16 bit data word between an allocated block of memory (within memory 211 of the data communications device 201) and the data register 373. Also as discussed in greater detail below with reference to FIGS. 12 and 15, DTE write and DTE read commands will include a byte count indicating the amount of data which will be transferred across the interface 202 and, accordingly, the DTE will transfer the exact number of data words corresponding to the byte count in the DTE read and write commands. In addition, memory management functions will have been performed during the processing of the command word, such as setting aside a block of memory 211 to queue the transferred data, in an amount as specified by the byte count indicator of the command word.

More specifically, for transfer of data from the DTE 200 through the data communications device 201 and to the network 104, a DTE initiated write cycle will begin with the DTE 200 transmitting a write command (a 16 bit word, discussed in greater detail below) to the command register 372. The processor 210 of the data communications device 201 will read the command word from the command register 372 and, based upon the contents of the command word, the processor 210 will request a block of memory 211 and will configure the DMA controller 240 for the upcoming data transfer, specifying the number of bytes of data and the logical channel (also as specified in the command). (The interface 202 may be divided into a plurality of logical channels for the transfer of data and commands; for example, logical channels may be associated with particular data or command ports for each data communications device 201 utilizing the interface 202.) The processor 210 will then acknowledge and respond to the DTE write request by generating an interrupt to the DTE 200 indicating that an acknowledgement is waiting to be read, and by setting acknowledgement ("ack") bits in the DTE write command.

The DTE 200 is then interrupted and will read the command register, which then causes a non-maskable interrupt ("NMI") to the processor 210, and the processor 210 will then fill the command register with a DTE write command acknowledgment. This indicates to the DTE 200 that the transfer request was acknowledged and data transfer may commence through the data register. The DTE 200 may then begin writing data words to the interface 202. Each such write to the data register 373 of the interface 202 will generate a DMA request (write) cycle to the DMA controller 240, and a word of data will be moved by the DMA controller 240 from the data register 373 to the allocated block of memory 211, for data transfer over the network 104 by the data communications device 201.

Continuing to refer to FIG. 3, for incoming data from the network 104, a DTE read cycle initiated by the data communications device 201 will begin with the processor 210 configuring the DMA controller 240 in preparation for data transfer (from the network to the data register 373), by forming a DTE read command indicating the channel and the number of bytes to be transferred, and by generating an interrupt to the DTE 200 (indicating that a command is waiting to be read). This interrupt will cause the DTE 200 to read the command register 372, which in turn will cause a non-maskable interrupt to the processor 210, and the processor 210 will then fill the command register 372 with a DTE read request. The DTE 200 will read the DTE read request from the command register 372 and, based upon the contents of the DTE read request, the DTE 200 will set up for incoming data, requesting a block of memory, and begin reading data words from the data register 373. The reading of the command register 372 will have indicated to the processor 210 that the transfer request was acknowledged and that data transfer may commence through the data register 373. Each read from the data register will generate a DMA request cycle to the DMA controller 240, and a word of data will be moved to the data register by the DMA controller 240 from an allocated block of memory 211 (previously determined when the DMA controller 240 was configured). It should be noted, for both reads and writes across the interface 202, once the actual data transfer has begun, no further interrupts to the DTE 200 or to the processor 210 are utilized or needed and, in that sense, data transfer is occurring in the "background" of the operations of the DTE 200 and the processor 210.

Also, in the preferred embodiment, all commands sent to the data communications device 201 from the DTE 200 will be acknowledged by the data communications device 201. If the command was executed, then the command is acknowledged by echoing the command in the command register 372 with the "ack" bit set. Command acknowledgment is utilized for synchronization, verification, and contention handling. Commands which could not be executed because of an invalid logical channel number, error or other reason will be responded to with the unable to service bit set in addition to the ack bit set. In the preferred embodiment, the ack bit is always set for command acknowledgments since it is the distinguishing factor between a command and a response. Commands sent from the data communications device 201 to the DTE 200 are not required to be acknowledged by the DTE 200 in the preferred embodiment.

Figure 9:
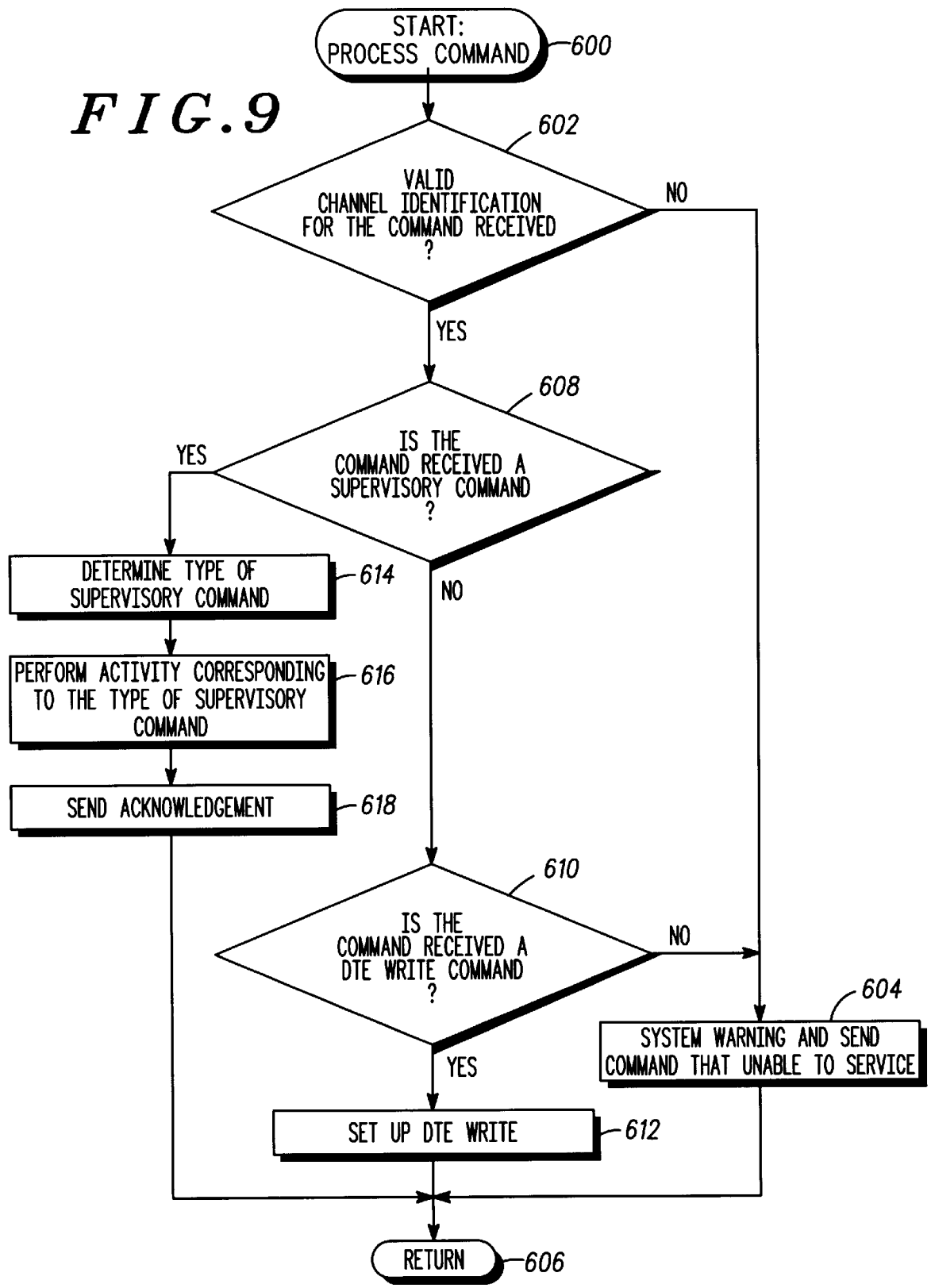
FIG. 9 is a flow diagram illustrating the process command routine in accordance with the present invention.

As indicated above, in the preferred embodiment, commands to and from the DTE 200 and the data communications device 201 are 16 bits, in which bits zero to six are used to indicate the length of the block of data to be transferred, for data transfers, or are used to define a supervisory command, for non-data transfer commands; bit 7 is the acknowledgement (ack) bit used by the DCD 201 to indicate that a command has been received and processed; bits eight to twelve identify a logical channel of the interface 202; bit 13 is an unable to service bit for commands, or a more/end bit utilized to signify the end of a frame for data transfers; bit 14 indicates whether the command is a read or write data request; and bit 15 is a supervisory/normal bit used to differentiate data transfers (normal) from supervisory commands (discussed in greater detail below with reference to FIG. 9). In the preferred embodiment, various commands include: a DTE read command, in which the DCD 201 informs the DTE 200 that a data transfer (using the DMA controller 240) has been set up and the DCD 201 is ready for the DTE 200 to begin reading data from the interface 202 (transmitted from the network 104); a DTE write command, in which the DTE 200 informs the DCD 201 that data is waiting to be transferred across the interface 202 (for transmission to the network 104); a flow off command, utilized by either the DTE 200 or the DCD 201 to instruct the other to stop read or write cycles across the interface 202 (because, for examples, data (memory) buffers are full); a flow on command, utilized by either the DTE 200 or the DCD 201 to instruct the other to resume read or write cycles across the interface 202; a no request pending command, utilized by the DCD 201 to inform the DTE 200 that there is no command pending to transfer to the DTE 200; enable and disable read interrupt commands, utilized by the DTE 200 to correspondingly allow or not allow an interrupt from the DCD 201 when a DTE read command is available for the DTE 200 to read; and enable and disable flow interrupt commands, utilized by the DTE 200 to correspondingly allow or not allow an interrupt from the DCD 201 when a flow off or flow on command is available for the DTE 200 to read.

Also as indicated above, interrupt processing and interface state parameters are utilized to maintain control over the interface 202, such that the interface 202 is not subject to simultaneous and mutually exclusive commands or uses, as explained in greater detail below. Control of data and commands across the interface 202 is accomplished through the use of predefined interface states (referred to as interface state parameters) and state transitions. In the preferred embodiment, the various states of the interface 202 include: a state of idle, in which the interface is not involved in activity; a state of DTE write data set up, in which the DMA controller 240 is being configured for a data transfer from the DTE 200; a state of waiting for the DTE to receive a write acknowledgement, in which the processor 210 is waiting for a command out non-maskable interrupt to occur in order that a DTE write command acknowledgement may be sent to the DTE 200, and indicates the readiness of the DCD 201 to receive data from the DTE 200; a state of DTE write DMA in progress, indicating that a data transfer from the DTE 200 to the DCD 201 is in progress in the background; a state of DTE read data set up, in which the DMA controller 240 is being configured for a data transfer to the DTE 200; a state of waiting for the DTE to receive a read command, in which the processor 210 is waiting for a command out non-maskable interrupt to occur in order that a DTE read command may be sent to the DTE 200, and indicates the readiness of the DCD 201 to transfer data to the DTE 200; a state of DTE read DMA in progress, indicating that a data transfer to the DTE 200 from the DCD 201 is in progress in the background; a state of processing a supervisory command, indicating that the DCD 201 is processing a supervisory command; a state of waiting for the DTE to receive a supervisory acknowledgement, in which the DCD 201 is waiting for a command out non-maskable interrupt to occur in order that a DTE supervisory command acknowledgement may be sent to the DTE 200, and indicates that the DCD has completed processing of a supervisory command; a state of waiting for the DTE to receive a supervisory command, in which the DCD 201 is waiting for a command out non-maskable interrupt to occur in order that a DTE supervisory command may be sent to the DTE 200; a state of queuing received data, in which the DCD 201 is queuing data received from the DTE 200 for transmission to the network 104 (FIG. 13, step 755); and a state of command pending, in which a command has been received by the DCD 201 from the DTE 200 and is saved for later processing.

Given the various interface states, various state transitions will also occur. For example, a non-maskable interrupt may occur indicating that the DCD 201 should send a command or a command acknowledgement to the DTE 200, or indicating that a command has been sent from the DTE 200. Another state transition, discussed below (FIG. 14, step 815), indicates that data from the network 104 has been received and queued by the DCD 201 and is ready for transfer to the DTE 200.

As mentioned above a contention situation may occur when the DTE 200 sends a command to the DCD 201 while the DCD 201 is processing a request. In the preferred embodiment, this contention situation is addressed by saving the command in memory and processing it after processing of the current request has been completed, for example, in the return to idle procedures illustrated in FIG. 18 (steps 955 and 960). Situations in which commands or requests are saved and deferred for subsequent processing include:

(1) transmit data available, namely, if the interface is not in the idle state (therefore indicating that another request is being processed), then a flag is set indicating that the DCD 201 has data ready to transmit to the DTE 200.

(2) a command received from the DTE 200, namely, if a command is received after the DCD has initiated the processing of another request, then the command is saved for subsequent processing and a command pending flag is set. In the preferred embodiment, the DTE 200 should not send another command until this command is acknowledged and, accordingly, it is not necessary to queue commands received from the DTE 200.

(3) a supervisory command to be sent to the DTE 200, namely, if the DCD 201 has a supervisory command to send while another request is being processed, then the supervisory command is put onto a supervisory command queue.

Also, in order to complete current command processing, commands are saved and state transitions are not allowed until the current task has been completed, i.e., a state change is not made by more than one source at a time (mutual exclusion). Since the interface operates across multiple interrupts and at task level, it should be ensured that no two sources can change the state of the interface at the same time. As a consequence, in the preferred embodiment, interrupts are disabled before the state of the interface is determined and enabled only after the state of the interface has been changed. Because the interrupts responsible for reading and writing commands are non-maskable in the preferred embodiment, no state changes are made during processing of a non-maskable interrupt; once the NMI has caused a command to be written or read (depending on the NMI), the NMI generates a lower level, secondary interrupt to complete the processing.

Figure 4:
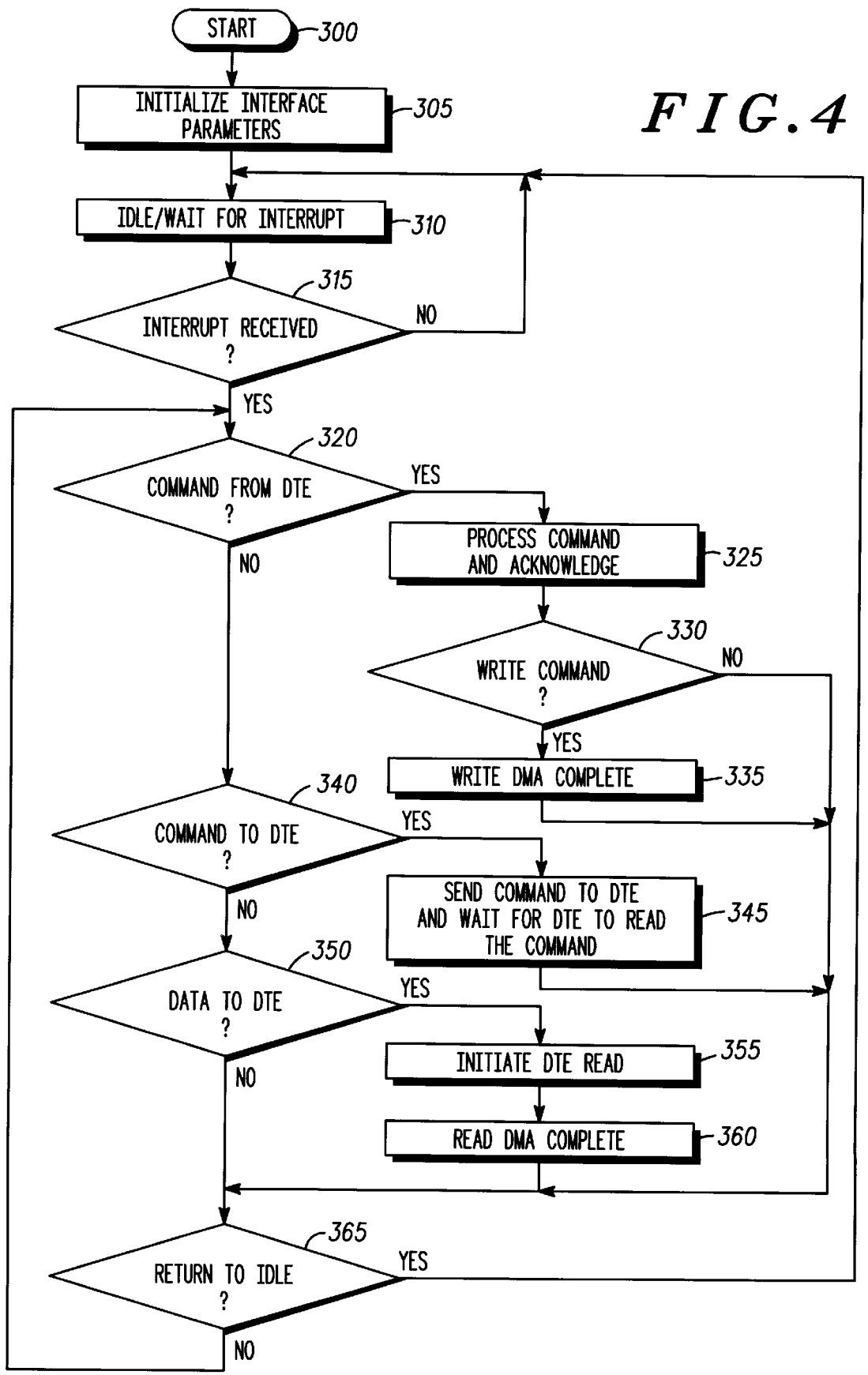
FIG. 4 is a high level flow diagram illustrating the overall method for high speed data transfer across an interface in accordance with the present invention.

In addition, if there are requests pending (e g, unprocessed commands, transmit data available) and the interface 202 is in the idle state, the preferred embodiment includes a mechanism to move the interface out of the idle state to process the pending requests, i.e., to trigger a state transition. For example, when the DCD 201 has transmit data available for transmission to the DTE 200, the data is queued, the interface state will be examined to determine if the interface 202 is idle, and if idle, a DTE read will be initiated, which changes the state of the interface to DTE read data set up, as illustrated in greater detail below with reference to FIGS. 14 and 15. Other events, such as commands from the DTE 200, are themselves non-maskable interrupts (or, equivalently, cause a non-maskable interrupt), which in turn causes a lower level, secondary interrupt that transitions the interface 202 out of the idle state and into a non-idle state. FIG. 4 is a high level flow diagram illustrating the overall method for high speed data transfer across an interface in accordance with the present invention. This method may be embodied as a set of program instructions resident, programmed or stored within the processor 210 and any associated memory, such as memory 21 1, as illustrated in FIG. 2. Referring to FIG. 4, the method begins, start step 300, and proceeds with initializing interface state parameters, step 305. This initialization procedure is explained in greater detail below with reference to FIG. 5. Next, the interface 202 enters the idle state referred to above, in which the processor 210 may wait for a non-maskable interrupt ("NMI") or perform other functions, step 310. If a NMI is not received by the processor 210 in step 315, the interface 202 continues to remain in the idle state, returning to step 310. If a NMI is received in step 315, the method then determines what type of command or event is or caused the NMI, proceeding to step 320. In the preferred embodiment, because various commands are automatically defined as non-maskable interrupts, no additional or separate signalling of or to the processor 210 is required. As a consequence, in the preferred embodiment, the logical step 315 is not included as a separate step, with the method proceeding directly from the waiting for an interrupt step 310 to the determinations steps of what kind of non-maskable interrupt occurred, proceeding directly to the various steps 320, 340 and 350.

Continuing to refer to FIG. 4, in step 320, the method determines whether a command was received from the DTE 200, step 320. If a command was received from the DTE 200 in step 320, the command is processed and acknowledged, step 325. This command processing step is explained in greater detail below with reference to FIGS. 6 and 9. If a command was received from the DTE 200 in step 320 and, if in step 330 the command received was a write command (previously processed in step 325), then the method proceeds to the write DMA complete subroutine, queuing the transferred data for transmission, step 330. These write command processing steps are explained in greater detail below with reference to FIGS. 11–13. Following steps 330 and 335, the method proceeds to a return to idle procedure, step 365. If the NMI received in step 315 was not a command from the DTE 200 in step 320, the method then determines whether the NMI was or was caused by a command to the DTE 200, step 340. If the NMI was or was caused by a command to the DTE 200 in step 340, then the method proceeds to send the command to the DTE 200 and wait for the DTE 200 to read the command, step 345, as explained in greater detail below with reference to FIGS. 7 and 10. When the processes of step 345 have been completed, the method proceeds to the return to idle procedures of step 365. If the NMI received (in step 315) was not a command from the DTE 200 (in step 320) and was not a command to the DTE 200 (in step 340), the method then determines whether the NMI was or was caused by the presence of data to be transferred to the DTE 200, step 350. If there is data to be transferred to the DTE 200 in step 350, the method initiates a DTE read process, step 355, and proceeds with the read DMA complete subroutine, step 360, freeing the block of memory which was previously queuing the data which has now been read by the DTE 200, as explained in greater detail below with reference to FIGS. 14–17. When the DTE read processes of steps 355 and 360 are complete, the method proceeds to the return to idle procedures of step 365. If an interrupt had been received without any of these three events or states (command from the DTE 200, command to the DTE 200, or data to the DTE 200) having occurred, from step 350, the method also proceeds with the return to idle procedures of step 365. Lastly, in the return to idle procedures of step 365, the method determines whether the processor 210 should return to an idle state, returning to step 310, or whether the processor 210 should proceed directly with the execution of other processes, returning to step 320. The return to idle procedures of step 365 are explained in greater detail below with reference to FIG. 18.

Figure 5:
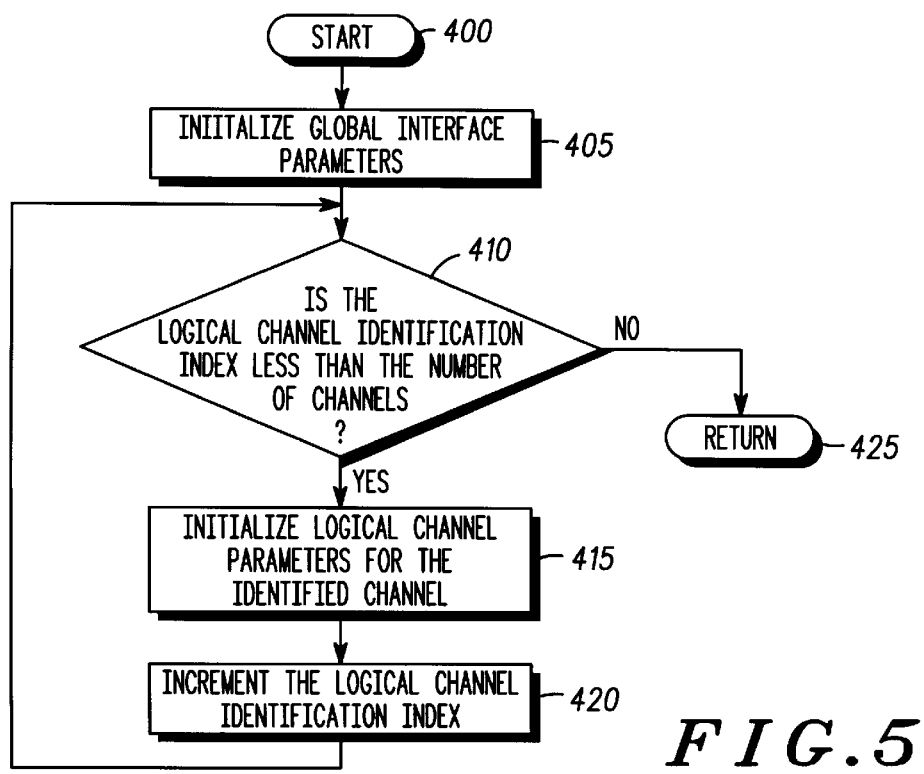
FIG. 5 is a flow diagram illustrating the procedures to initialize the interface parameters in accordance with the present invention.

FIG. 5 is a flow diagram illustrating the procedures to initialize the interface state parameters. As mentioned above (FIG. 3, step 305), the interface state parameters are a set of variables stored in memory, and may also be referred to or characterized as status flags or status signals. These interface state parameters represent a state or status of the physical interface, such as interface 202, as data may be transferred across the interface 202, and also may corresponding represent a state or status of the processor 210, such as processor 210, as it executes various commands or is involved in various processes, such as waiting for a command, configuring the DMA controller 240, or transferring data across the interface 202. As such, these variables or interface parameters may also be characterized as status flags which are monitored by the processor 210 prior to changing states or beginning another procedure. For example, prior to returning to an idle state, as indicated above, the method (as programmed in the processor 210) examines the various interface state parameters (in step 365) to determine whether there is another command pending and, if so, directly proceeds to execute the command process (step 320) rather than returning to an idle state (step 310). As a consequence, at the beginning of the method, step 305, the interface state parameters (or status flags) are initialized, i.e., set to initial values, indicating that nothing has occurred or is currently in the process of occurring. In addition, the physical interface, such as interface 202, may also have a plurality of logical channels multiplexed over the same physical interface and, if so, all interface state parameters for each such logical channel also should be initialized.

Continuing to refer to FIG. 5, the initialization of the interface state parameters begins, start step 400, and general or global interface parameters are initialized, step 405. In the preferred embodiment, these general interface parameters, and their corresponding initial values, include: (a) a command pending parameter, initially set to false (or zero), to indicate that no command from the DTE 200 is currently pending; (b) a DMA channel identification, initially set to 255, to indicate that no read or write processes are pending completion; (c) a command out parameter, initially set to no request pending, to indicate that the data communications device does not have any pending request to the DTE 200; (d) logical channel and transmit channel identification indexes, initially set to logical zero, to set loop counting indexes; (e) supervisory command queue parameters, initially set to logical zero, to indicate that no supervisory commands are queued for processing; (f) command received and command sent parameters, initialized to false, to indicate that nothing has been received from the DTE 200 or sent to the DTE 200; and (g) a state monitor parameter, initialized to disable monitor, to indicate that nothing has occurred on the interface 202 which might "lock up" the interface. In step 410, the logical channel identification index (having been initialized above, and subsequently incremented in step 420) is compared with the number of logical channels of the interface 202. If the logical channel identification index is greater than the number of logical channels in step 410, then all logical channels have been initialized, and the initialization process may end, step 425. If the logical channel identification index is less than or equal to the number of logical channels in step 410, then not all logical channels have been initialized, and the initialization process proceeds, in step 415, to initialize logical channel parameters for the particular logical channel indicated by the logical channel index. In the preferred embodiment, the logical channel parameters, and their initializations in step 415, for each logical channel, include: (a) a transmit data available parameter, initially set to false, indicating that the particular logical channel does not have data available to transmit to the DTE 200 from the data communications device 210; (b) a flow state parameter, initially set to flow on, to indicate that data may be transmitted to the DTE 200 when it is available; (c) a read interrupt parameter, initially set to true, to indicate that the DTE 200 may be interrupted when data is available for transmission to the DTE 200 and reading by the DTE 200; and (d) a flow interrupt parameter, initially set to true, to indicate that the DTE 200 may be interrupted to stop a flow of data across the interface 202. Next, in step 420, the logical channel identification index is incremented, followed by returning to step 410 and repeating step 415 for each logical channel until all channels have been initialized (as indicated by the logical channel identification index), and ending the initialization process, return step 425.

Figure 6:
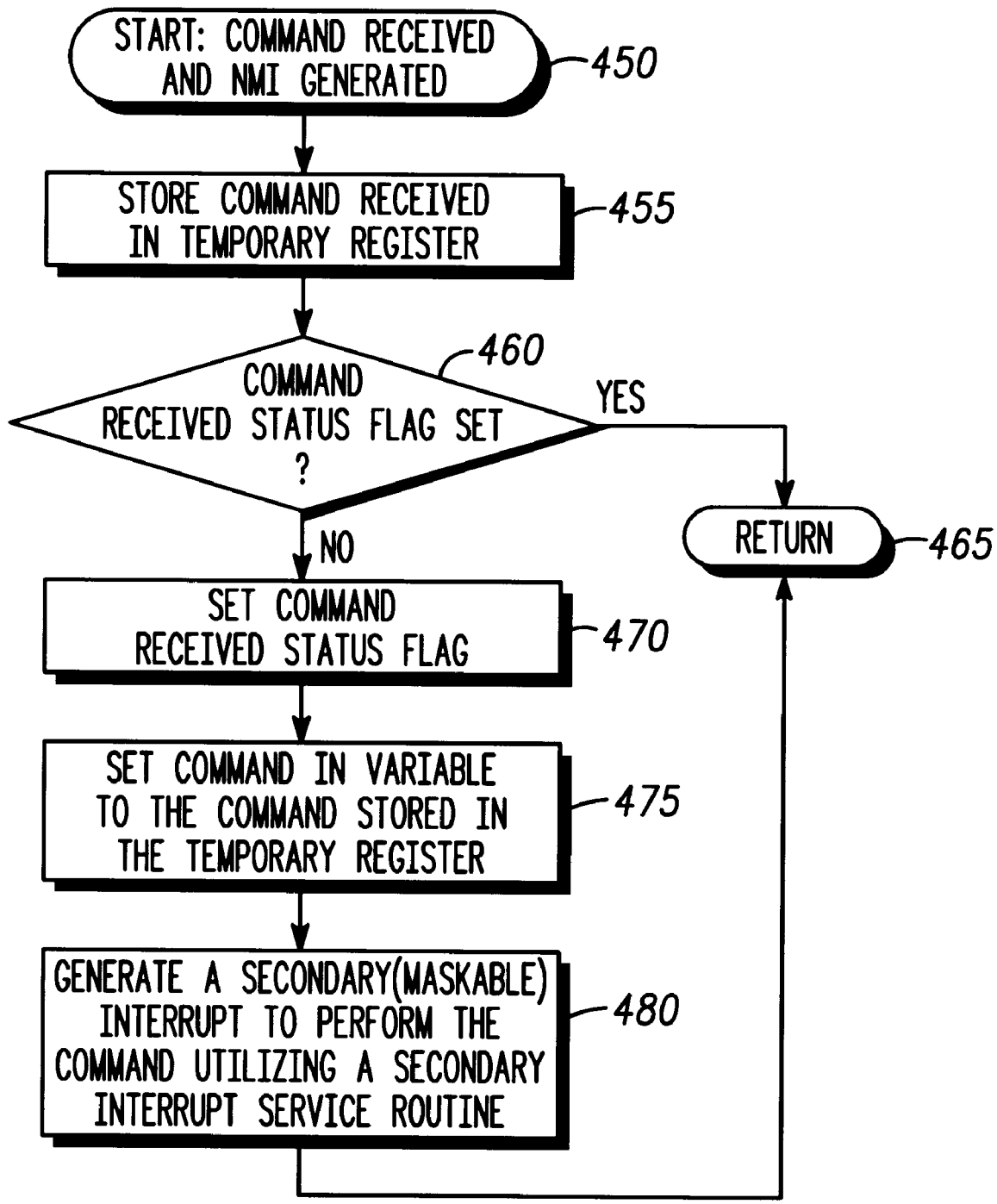
FIG. 6 is a flow diagram illustrating a command in (a command to a data communications device from a DTE) interrupt service routine, in accordance with the present invention.
Figure 7:
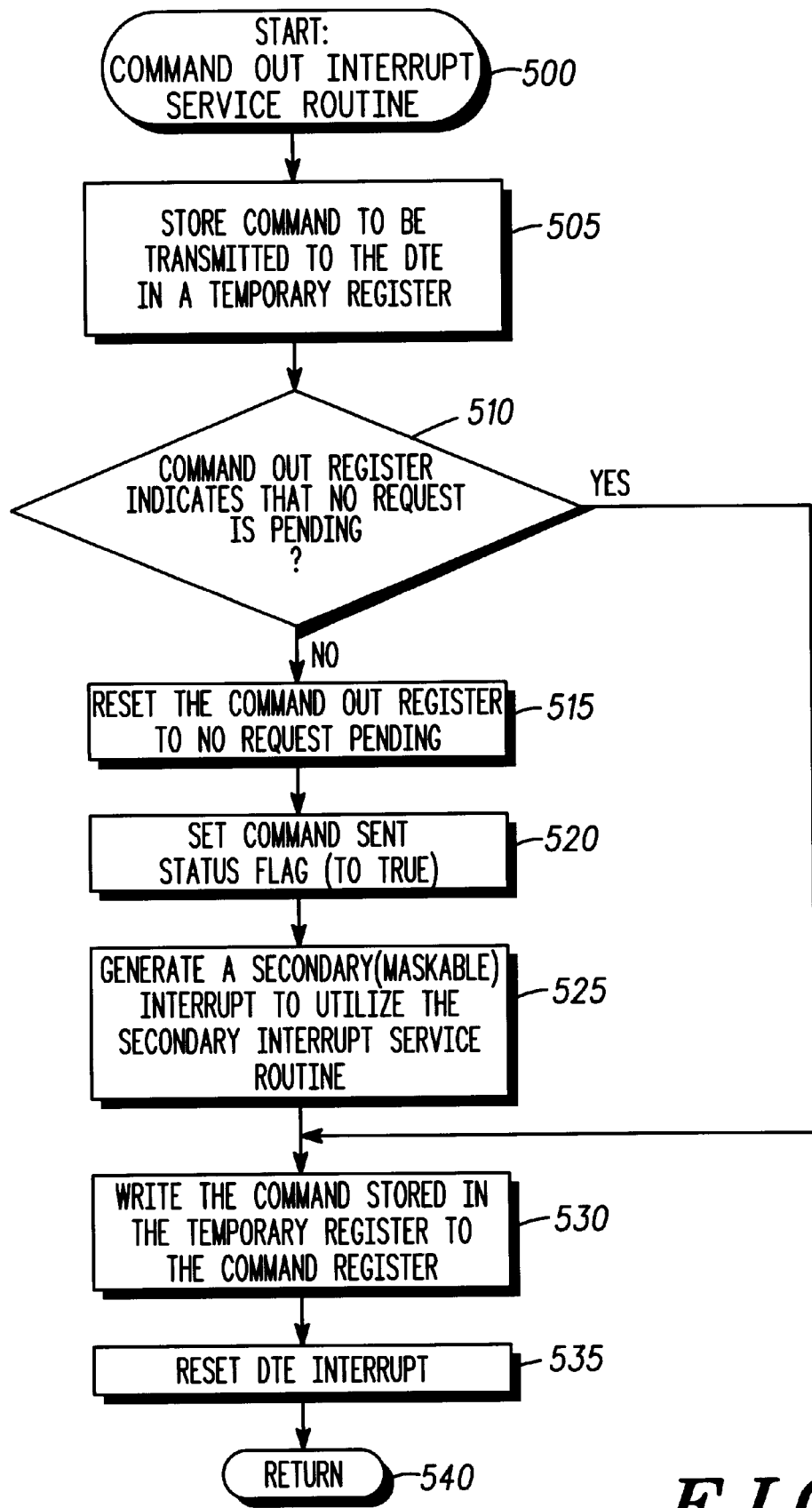
FIG. 7 is a flow diagram illustrating a command out (a command to be sent to a DTE by a data communications device) interrupt service routine, in accordance with the present invention.

Following initialization procedures, the method proceeds to enter (i.e., have the interface 202 enter) an idle state, as indicated in step 310 of FIG. 4. While this state is referred to as idle, it may also be conceptualized as semi-idle or some other type of active state, as a variety of processes may be occurring in this idle state which do not involve the transfer of data across the interface 202. FIGS. 6 and 7 illustrate two of these processes which may occur in this idle state of the interface 202. FIG. 6 is a flow diagram illustrating a command in interrupt service routine (for a command to the data communications device 201 from the DTE 200). Referring to FIG. 6, beginning with start step 450, when a command from a DTE 200 is received by the processor 210 (in the command register 372) of the data communications device 201, a NMI is generated to the processor 210, initiating the command in interrupt service routine. The command is initially stored in a temporary register, step 455, to avoid possibly displacing another command (previously sent) which may be currently in the command in register (i.e., a location in memory 211 designated as a command in register). The processor 210 then determines, in step 460, whether a command received status flag was set (i.e., set to true). If the command received status flag was set, it indicates that a command was sent previously, is still being processed, and should not be interrupted. As a consequence, when the command received status flag was set in step 460, the command received (i.e., the currently or just received command) will be ignored (effectively discarded), since a command was received previously but not yet processed by the lower level, secondary interrupt, and the command in interrupt service routine may end, return step 465. It should be noted that this would be an abnormal situation in which the DTE 200 had not waited for an acknowledgement for a command which was sent previously. If the command received status flag was not set in step 460, it indicates that no command was sent previously which is still being executed, and indicates that the processor 210 may proceed to execute the command received without potentially interrupting another process. As a consequence, when the command received status flag was not set in step 460, the method proceeds to steps 470, 475 and 480, which may be executed concurrently, sequentially, or in any order. In step 470, the method sets the command received status flag (to true) to indicate that the command received is being processed and should not be interrupted. In step 475, a command in register (or variable) is set to the command previously stored in the temporary register in step 455, as no other command is pending which could be displaced by the current command received. In step 480, a secondary or maskable interrupt is generated, to perform the command utilizing a secondary interrupt service routine, discussed in greater detail below with reference to FIG. 8, which will also change the state of the interface 202 from an idle state to a non-idle state.

FIG. 7 is a flow diagram illustrating a command out interrupt service routine (for a command to be sent to the DTE 200 by the data communications device 201), which also may occur while the interface 202 is in an idle state. Beginning with start step 500, the processor 210 stores the command to be transmitted to the DTE 200, which is in a command out register (i.e., a designated location in memory 211), in a temporary register. The processor 210 then determines whether the command out register now indicates that no request is pending, step 510. If the command out register currently indicates that no request is pending, then the interface 202 does not need to exit the idle state, as the DTE 200 has previously read any command which was in the other, second register, referred to as the command register 372 (as distinguished from the command out register), and the process may proceed to step 530 (in which the current command held in the temporary register is written into the command register, to be subsequently read by the DTE 200). If the command out register indicates that there currently is a request pending in step 510, then the method proceeds to steps 515, 520 and 525, which may be executed concurrently, sequentially, or in any order. In step 515, the processor 210 resets the command out register to no request pending, and in step 520, the processor 210 sets the command sent status flag (to true). In step 525, the processor 210 generates a secondary (maskable) interrupt to utilize the secondary interrupt service routine (discussed below with reference to FIG. 8), in which the interface 202 will come out of the idle state. The command stored in the temporary register (in step 505) is then written to the command register (to be read by the DTE 200) in step 530, the DTE interrupt is also reset, step 535, and the command out interrupt service routine may end, return step 540.

Figure 8A:
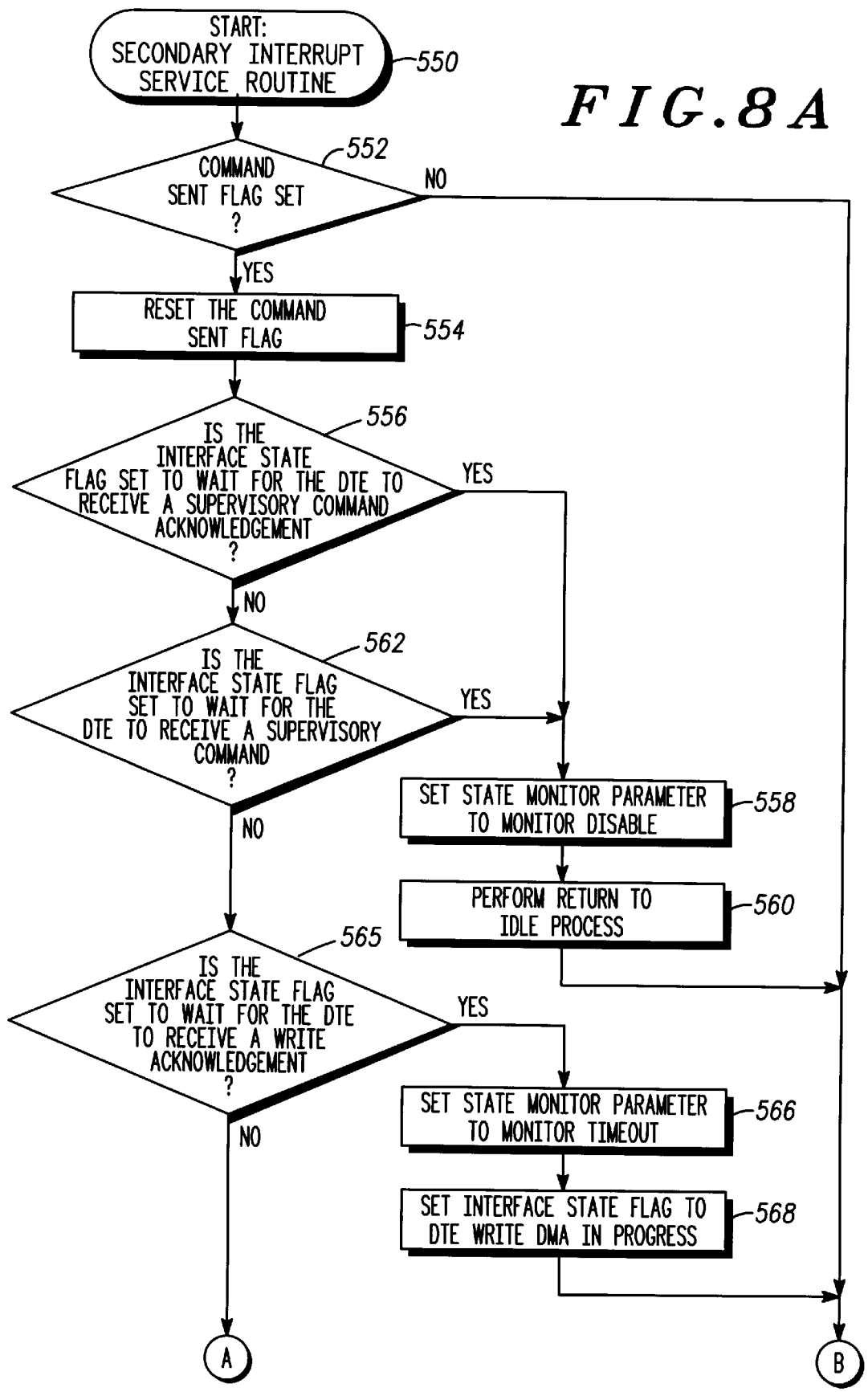
FIG. 8 is a flow diagram illustrating the secondary (or maskable) interrupt service routine in accordance with the present invention.
Figure 8B:
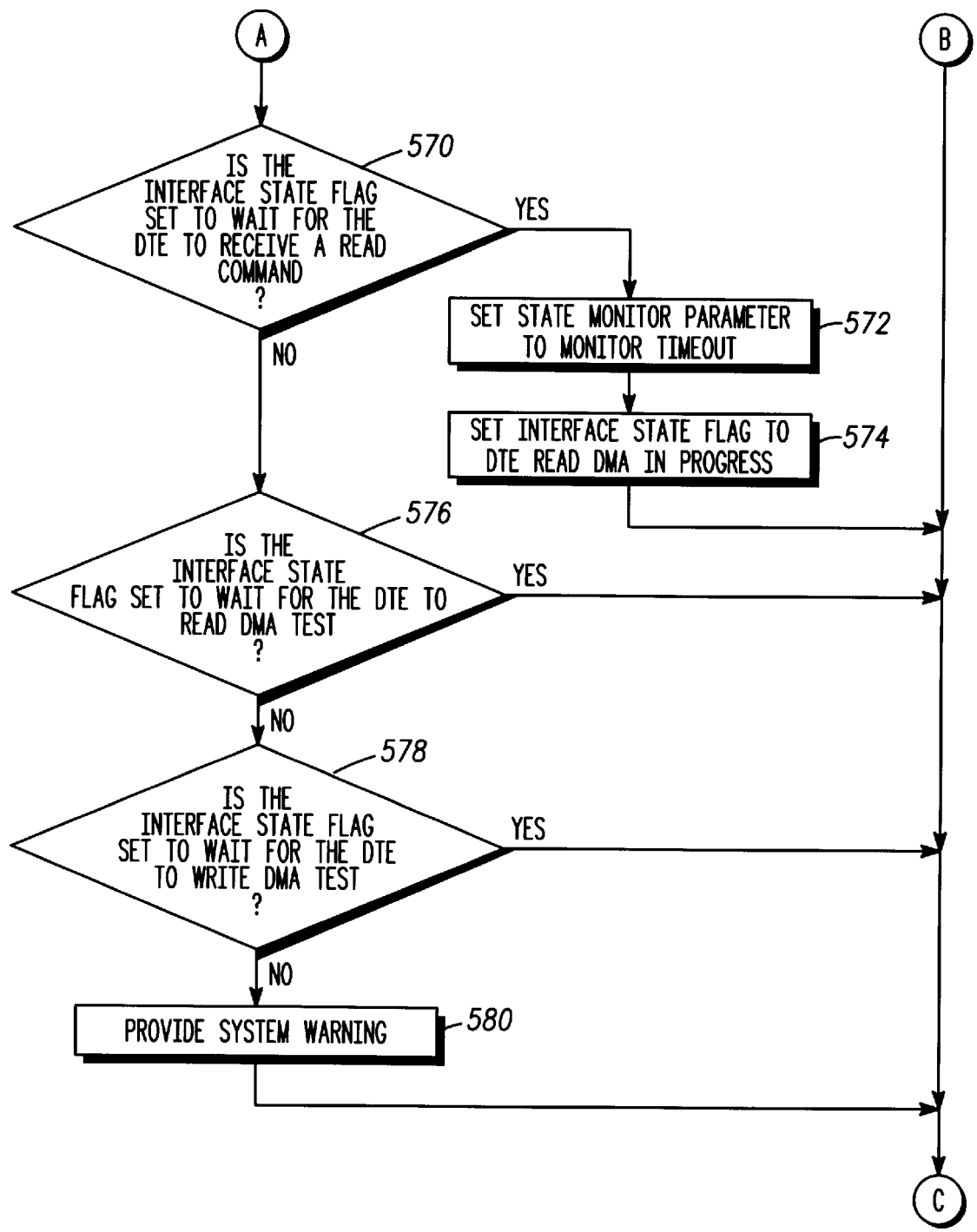

FIG. 8 is a flow diagram illustrating the secondary (or maskeable) interrupt service routine. The secondary interrupt service routing is initiated by a secondary or maskable interrupt generated, for example, to perform a command received (in step 480, FIG. 6) or to send a command to the DTE 200 (in step 525, FIG. 7), and is utilized to prevent interruptions from occurring during particular processes. For example, during a routine which should not be interrupted, the secondary (maskeable) interrupt may be disabled (i.e., masked); in that event, the secondary interrupt may be saved and performed subsequently, following the removal of the interrupt disable (i.e., an interrupt enable). Referring to FIG. 8, the secondary interrupt service routine begins, start step 550, with a determination of why the routine was started, i.e., what status flag was set, due to a command sent to the DTE 200 (step 552) or due to a command received from the DTE 200 (step 582). In step 552, if the command sent flag (interface state parameter) was not set (to true), the method proceeds to step 582 to determine whether the command received flag was set. If the command sent flag was set (to true) in step 552, the command sent flag is reset (step 554), and the various states of the interface are examined for each of the types of commands which may have been sent to the DTE 200 (steps 556, 562, 564, 570, 576, and 578). These steps 556, 562, 564, 570, 576, and 578 may be performed concurrently, sequentially, or in any order.

Continuing to refer to FIG. 8, the interface state flag (interface state parameter) is examined to determine whether it is set to wait for the DTE 200 to receive a supervisory command acknowledgement, step 556. If the interface state flag is set to wait for the DTE 200 to receive a supervisory command acknowledgement in step 556, then the state monitor parameter (or flag) is set to monitor disable, step 558, and the return to idle process is performed (illustrated in FIG. 18), step 560. Steps 556, 558 and 560 reflect that at a previous time, the processor 210 received a command from the DTE 200, processed it, and sent an acknowledgment back to the DTE 200. Because the command sent flag was set, this indicates that the DTE 200 received the acknowledgement and, as a consequence, the state monitor parameter may be reset and the processor 210 may proceed to the return to idle routine. If the interface state flag was not set to wait for the DTE 200 to receive a supervisory command acknowledgement in step 556, then the process proceeds to step 562, to determine whether the interface state flag is set to wait for the DTE 200 to receive a supervisory command. If the interface state flag is set to wait for the DTE 200 to receive a supervisory command in step 562, the process proceeds to step 558 and step 560 discussed above. Steps 562, 558 and 560 reflect that the processor 210 had a command to send to the DTE 200 and sent it, followed by the DTE 200 reading the command and so informing the processor 210 by setting the command sent flag, so the method may also return to idle (via the return to idle routine illustrated in FIG. 18 (step 560), however).

Continuing to refer to FIG. 8, if interface state flag was not set to wait for the DTE 200 to receive a supervisory command in step 562, then the process proceeds to step 564, to determine whether the interface state flag is set to wait for the DTE 200 to receive a write acknowledgement. If the interface state flag is set to wait for the DTE 200 to receive a write acknowledgement in step 564, the method sets the state monitor parameter to monitor timeout, step 566, and sets the interface state flag to DTE write DMA in progress, step 568, which are discussed in greater detail below with reference to FIGS. 11–13. When the interface state flag is set to wait for the DTE 200 to receive a write acknowledgement, it indicates that the DTE 200 previously sent a write command to the DTE 200 indicating that the DTE 200 had data to transmit to the data communications device 201 for transmission over the communications channel 106. In response, the processor 210 prepares to receive the data (FIGS. 11–13) and transmits an acknowledgement to the DTE 200 (FIG. 4, steps 325, 330 and 335). The setting of the interface flag to wait for the DTE 200 to receive a write acknowledgement indicates that the acknowledgement has been read by the DTE 200. As a consequence, the processor 210 is waiting to receive data, sets a timeout limit (step 566), and sets the interface flag to indicate that a DTE write (to the data communications device 201) is in progress (step 568) (and the method will be proceeding with the steps illustrated in FIGS. 11–13). Similarly, if interface state flag was not set to wait for the DTE 200 to receive a write acknowledgement in step 564, then the process proceeds to step 570, to determine whether the interface state flag is set to wait for the DTE 200 to receive a read command. If the interface state flag is set to wait for the DTE to receive a read command, then the processor 210 sets the state monitor parameter to monitor timeout, step 572, and sets the interface state flag to DTE read DMA in progress, step 574, which are also discussed in greater detail below with reference to FIGS. 14–17. When the interface state flag is set to wait for the DTE 200 to receive a read command, it indicates that the processor 210 has previously sent the DTE 200 a read command (FIG. 15, step 855), which does not require acknowledgement. As a consequence, the processor 210 also begins the monitor timeout process (step 572) and sets the interface flag to indicate that a DTE read (transferring data from the data communications device 201 to the DTE 200) is in progress (step 574) (and the method proceeds with the steps illustrated in FIGS. 16–17). Lastly, in the preferred embodiment, the command sent flag is also examined to determine if diagnostic tests have been run, such as a read DMA test routine (step 576) and a write DMA test routine (step 578), in which predetermined, test data streams may be transferred and checked for accuracy. If the command sent flag were set, but none of the interface state flags (interface state parameters) indicate one of the commands discussed above, then a system warning is issued, step 580, indicating that something may be erroneous because the command sent flag was set, but no allowable command was found.

Continuing to refer to FIG. 8, following any of steps 552, 560, 568, 574, 576, 578 and 580, the method proceeds to step 582, to determine whether the command received flag is set (to true). If the command received flag is not set, the secondary interrupt service routine ends, return step 599 (with the method proceeding with the various read or write operations discussed above). If the command received flag is set in step 582, the command in (i.e., just received) is stored in a temporary command register, step 584, and the command received flag is reset (to false), step 586. Proceeding to step 588, the interface state flag is examined to determine whether it is set to idle, and if so, the processor 210 exits from the idle state, step 590, and in step 592, processes the command (illustrated in FIG. 9). If the interface state flag is not set to idle in step 588, indicating that another process may be occurring, the command in, stored in the temporary command register, is examined to determine whether it is a reset channel command, step 594, and if so, the channel is reset, step 596. When the interface is not idle (step 588) and the command was not a reset command (step 594), the procedure sets the command pending flag, step 598, utilized in the return to idle procedure illustrated in FIG. 18, indicating that when the interface 202 is available, another command is waiting for execution, and the secondary interrupt service routine ends, return step 599.

FIG. 9 is a flow diagram illustrating the process command routine. The process command routine illustrated in FIG. 9 may be called or may occur when, first, the DTE 200 has sent a command to the data communications device (FIG. 3, steps 320 and 335), followed by setting the command received flag (FIG. 8, step 582), and second, when the interface 202 was in the idle state (FIG. 8, step 588), such that the interface 202 exits the idle state (FIG. 8, step 590) and the processor 210 processes the command (FIG. 8, step 592), and is performed as a secondary interrupt service routine (of FIG. 8) following the command in interrupt service routine (illustrated in FIG. 6). The process command routine of FIG. 9 also may be called or may occur from the return to idle process, discussed below with reference to FIG. 18, when another command is pending (FIG. 8, step 598) and should be processed prior to returning to idle (steps 955 and 960). Referring to FIG. 9, the process command routine, beginning with start step 600, first determines whether the logical channel identification (as identified in the command received) is a valid identification, for example, is less than or equal to the maximum number of allowed logical channels, step 605. If the logical channel identification is invalid in step 602, in the preferred embodiment, the method (through the processor 210) issues a system warning that an invalid command was received, and sends a command to the DTE 200 (send command) indicating the command received, that it is acknowledged and unable to be serviced, and that the processor 210 will wait for the DTE 200 to receive a supervisory acknowledgement, step 604, and the process command process terminates, return step 606. (In the preferred embodiment, the send command (from the processor 210 to the DTE 200, utilized above in step 604 and illustrated in FIG. 10) has two parts, first, the command which is to be sent, and second, the next state to which the interface 202 will transition. Also in the preferred embodiment, the various commands are typically represented in binary or hexadecimal, and may be logically ORed with other information, such as the acknowledgement and the unable to service information mentioned above (also represented in binary or hexadecimal).)

Continuing to refer to FIG. 9, when the logical channel identification is valid in step 602, the process determines whether the command received (stored in the command in register) is a supervisory command, step 608. In the process command routine of the preferred embodiment, commands are divided into two types, non-supervisory commands, which are read or write commands, and supervisory commands, which are all other commands, for example, those commands which may be utilized to control the transfer of data across the interface. In the preferred embodiment, as mentioned above, supervisory commands are indicated utilizing the most significant bit (bit 15) of the command (stored in the command in register). If in step 608 the command received is not a supervisory command, the process determines whether the command received is a write command, such that the DTE 200 has information (data) and is going to send the information to the data communications device 201 for transmission on the communications channel, step 610. When the command received is a write command in step 610, the processor 210 (in the data communications device 201) then prepares for the data transfer process, calling a set up DTE write subroutine, step 612, discussed in greater detail below with reference to FIG. 11, and the process command routine may terminate, return step 606. If the command received was not a supervisory command (step 608) and was not a write command (step 610), then a system warning and send command is again issued, returning to step 604. If in step 608 the command received is a supervisory command, then in step 614, the process determines what type of supervisory command was received. The process command routine then performs the activity corresponding to the type of supervisory command, step 616, and sends an acknowledgement to the DTE 200, step 618, and the process command routine may terminate, step 606.

In the preferred embodiment, steps 614, 616 and 618 are implemented as a series of conditional (if-then) blocks, for each type of supervisory command, followed by corresponding processing and acknowledgement steps. For example, when the command received is a supervisory command in step 608, in the preferred embodiment, the method then sequentially determines, as subparts of step 614, whether the command received is a flow off command, a flow on command, a disable read interrupt command, an enable read interrupt command, a disable flow interrupt command, an enable flow interrupt command, a flush channel command, a reset channel command, a version request command, a DTE read test command, and a DTE write test commands. Utilizing conditional blocks, when the command received is one of these particular commands, the method then proceeds with corresponding steps 616 and 618, to perform the processing corresponding to the particular command received. When the command received is a flow off command, indicating that data buffers in the DTE 200 are or are becoming full and no further data should be sent (until a flow on command is received), the corresponding process step 616 consists of setting the flow state (an interface parameter) to off, for the particular channel, followed by transmitting an acknowledgement (step 618). In the preferred embodiment, the disable and enable flow interrupt commands are correspondingly utilized to set flags (interface parameters) in step 616 to avoid or allow interruptions to the DTE 200 when there is a flow off or flow on command waiting to be read by the DTE 200. Accordingly, the disable and enable read interrupt commands are correspondingly utilized to set flags (interface parameters) in step 616 to avoid or allow interruptions of the DTE 200 when there is a read command waiting to be read by the DTE 200. The send command routine (FIG. 10) sets the DTE interrupt flag (causing an interrupt to the DTE 200), or does not set the DTE interrupt flag (causing no interrupt to the DTE 200) based upon the read interrupt and flow interrupt interface parameters described above. In the preferred embodiment, other supervisory commands (for step 614) and corresponding activities to be performed (in step 616) include a flush channel command, in which a logical channel is cleared of data which has not yet been processed; a reset channel command, in which any ongoing process is aborted; a version request command, in which the most current version of the code for the interface firmware is sent to the DTE 200; and DTE write and read test commands, in which the DTE 200 writes to or reads from the interface using information stored in test buffers, and usually followed by corresponding write and read test commands, to compare the information and test the integrity of the interface system.

Figure 10:
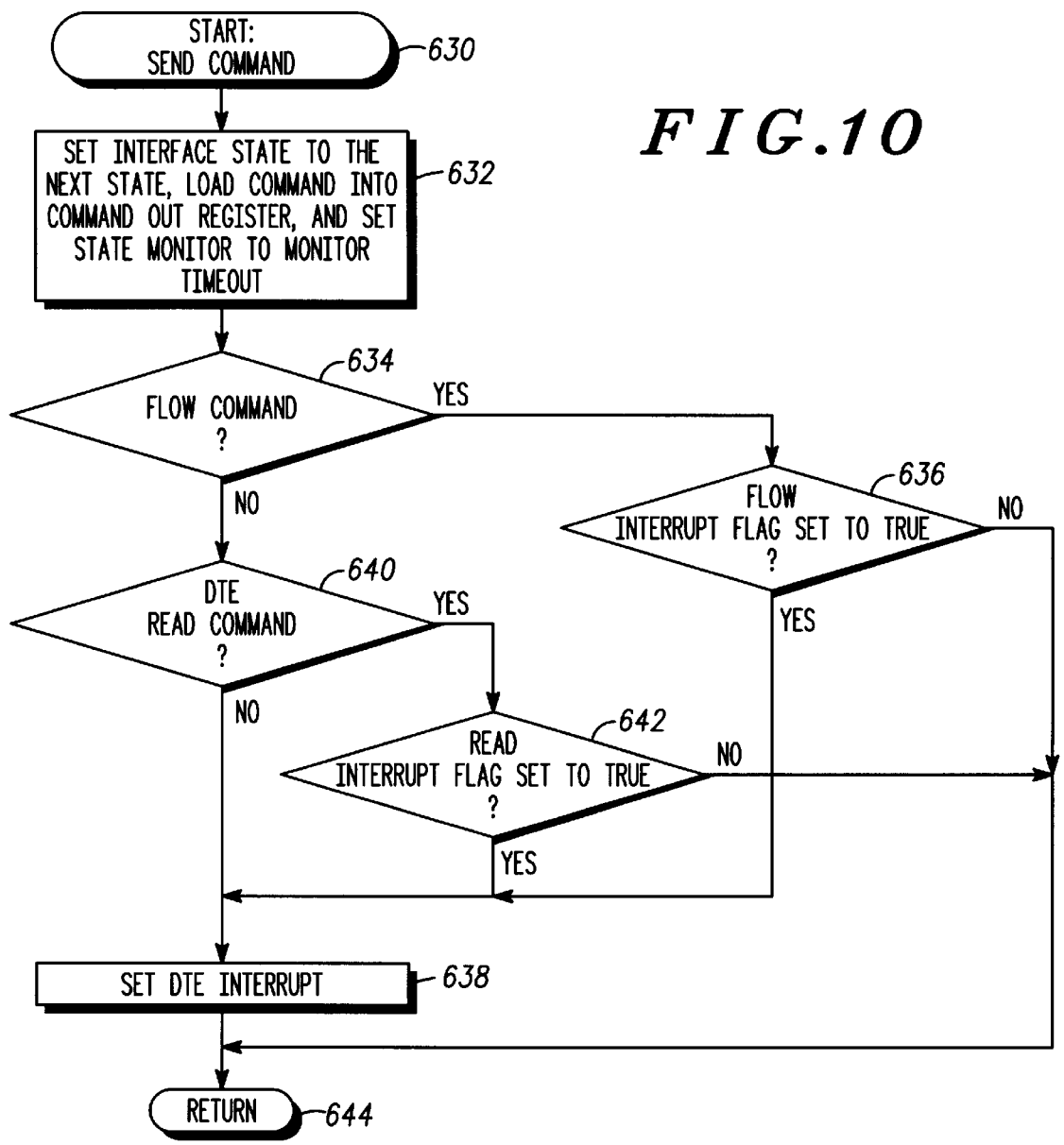
FIG. 10 is a flow diagram illustrating a send command routine, which is utilized in the preferred embodiment when a data communications device is to send a command to a DTE, in accordance with the present invention.

FIG. 10 is a flow diagram illustrating a send command routine, which is utilized in the preferred embodiment when the data communications device 201 is to send a command to the DTE 200. For example, the send command routine is utilized to have the DTE 200 read in data, across the interface 202, which the data communications device 201 has received via the communications channel 106, or may be utilized to transmit an acknowledgement or supervisory command to the DTE 200. Also as mentioned above, in the preferred embodiment, the send command has two portions, first, the command which is to be sent, and second, the next state of the interface 202. When the send command is utilized in the data transfer methodology, in the preferred embodiment, the send command (abbreviated as cmd) specifies this ordered pair as Send_Cmd (Cmd, next_state). As a consequence, following start step 630 in FIG. 10, in step 632, the interface state is set to the next state, the command to be sent is loaded or transferred into the command out register of the processor 210 (to be read by the DTE 200), and the state monitor parameter is set to monitor timeout (as the data communications device is waiting for the DTE 200 to read the command in the command out register). Following step 632, depending upon the type of command, the interface parameters (status flags) are examined to determine whether an interrupt signal may be transmitted to the DTE 200, via setting a DTE interrupt flag. As a consequence, when the command is a flow on or flow off command in step 634, and the flow interrupt parameter is set (to true) (step 636), then the DTE interrupt is set, step 638. Similarly, when the command is a DTE read command in step 640, and when the read interface parameter is set (to true) (step 642), then the DTE interrupt is also set, step 638. When the command is not a flow on or flow off command in step 634, and is not a DTE read in step 640, then the DTE interrupt is also set, step 638. Conversely, when the command is a flow on or flow off command in step 634, or is a DTE read in step 640, but the corresponding interface parameters (flow interrupt and read interrupt) are not set to true, indicating that the DTE 200 is not to be interrupted, then the DTE interrupt is not set and the send command routine may end, return step 644.

Figure 11:
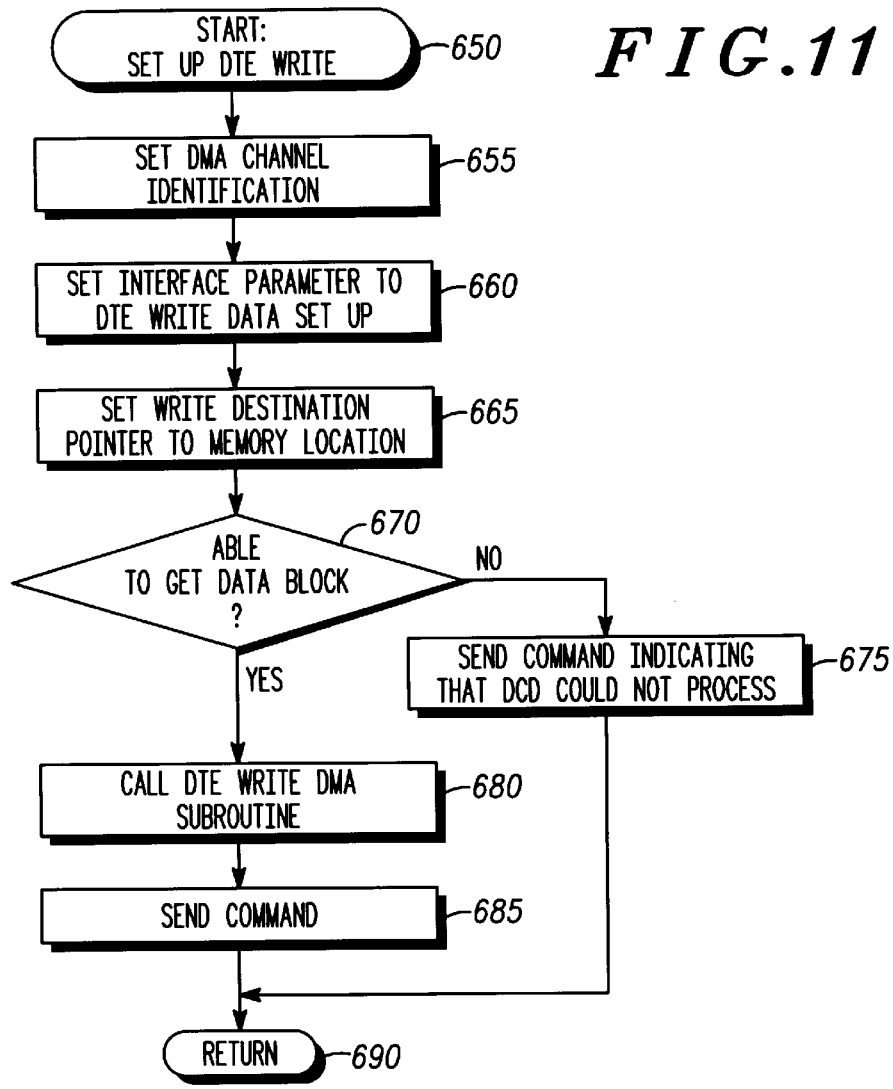
FIG. 11 is a flow diagram illustrating the set up DTE write subroutine in accordance with the present invention.

As indicated above for steps 610 and 612 of FIG. 9, when the DTE 200 has data for transmission and transmits a DTE write command to the data communications device 201, for processing the DTE write command, the process command routine includes calling a subroutine for setting up a DTE write operation (step 612). Such a write operation, in which the DTE 200 transfers data to the interface 202 for subsequent transmission over a communications channel 106 to the network 104, is illustrated in the flow diagrams of FIGS. 11 through 13. FIG. 11 is a flow diagram illustrating the set up DTE write subroutine, the first subroutine for the write operation. It should be noted that while in the preferred embodiment the read and write operations from and to the interface 202 are embodied as subroutines, those skilled in the art may also combine or implement these operations in other equivalent forms. Referring to FIG. 11, beginning with start step 650, the set up DTE write subroutine sets the DMA channel identification equal to the channel identified in the DTE write command, step 655, sets the interface parameter (state variable) to indicate that a DTE write data set up is in progress, step 660, and sets a write destination pointer to a memory location (in memory 211), step 665. Next, in step 670, if the processor 210 was unable to get a data block (16 bits) from the data register 373 of the interface 202, then it sends a command to the DTE 200 indicating that the data communications device 201 could not process the DTE write command, step 675, in which the send command to the DTE 200 echoes the DTE write command, with the ack bit set and with the unable to service bit set, and with a next state equal to waiting for the DTE to send a supervisory acknowledgement. If in step 670 the processor 210 was able to get a data block (16 bits) from the data register 373 of the interface 202, then in step 680 the processor 210 calls a DTE write DMA subroutine, discussed in greater detail below with reference to FIG. 12. Next, in step 685, the processor 210 sends a command to the DTE 200 indicating that the data communications device 201 is ready to receive data from the DTE 200, in which the send command to the DTE 200 echoes the DTE write command, with the ack bit set, and with a next state equal to waiting for the DTE to receive (or read) a write acknowledgement (such that the processor 210 is waiting for the command out NMI to occur in order that the DTE write acknowledgement can be sent to the DTE 200), followed by return step 690.

Figure 12:
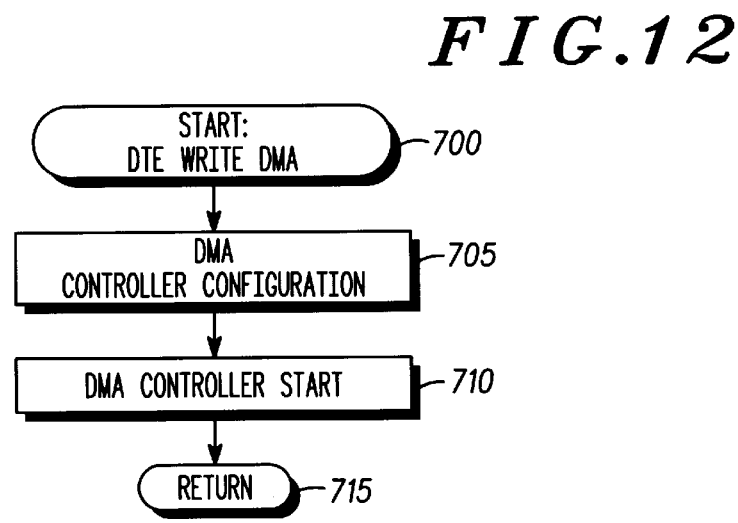
FIG. 12 is a flow diagram illustrating the DTE write DMA subroutine in accordance with the present invention.

FIG. 12 illustrates the DTE write DMA subroutine, called in step 680 of the set up DTE write subroutine illustrated in FIG. 11. Referring to FIG. 12, following start step 700, in step 705, the processor 210 configures the DMA controller 240 for receiving data written to the interface 202 by the DTE 200, and transferring the data to a memory location (in memory 211) as indicated by the write destination pointer. In the preferred embodiment, the DMA controller is configured with (1) a source pointer equal to the address of the data register 373 of the interface 202 or, equivalently, the address of the transceiver 206 (and which source pointer is not incremented, such that the DMA controller 240 effectively treats the interface 202 (or transceiver 206) equivalently to a memory location); (2) source and destination data sizes equal to one word (16 bits); (3) a write destination pointer equal to an address location in memory 211, which is incremented for each write operation cycle (as additional information is transferred from the interface 202 into memory 211); (4) a byte count equal to the block length of the data to be sent by the DTE; (5) an interrupt pointer equal to the memory address of a write DMA complete subroutine (discussed below with reference to FIG. 13); and (6) an interrupt mode set to generate an interrupt when the DMA controller 240 has completed the data transfer. Next, in step 710, the processor 210 starts the DMA controller 240, such that every time the DTE 200 writes one word of data to the interface 202, the DMA controller 240 places it in memory 211 at the location indicated by the write destination pointer, which is then subsequently incremented (for the next data word (16 bits)). As illustrated above in FIG. 8, this process is performed as a secondary interrupt service routine (steps 564, 566 and 568), such that once the DTE 200 has read the acknowledgement (step 685 illustrated in FIG. 11), the DTE 200 generates a secondary interrupt and the interface state is set to DTE write DMA in progress. Having been configured with information concerning the number of bytes to be transferred, once the transfer has been completed, the DMA controller 240 generates an interrupt which, utilizing the address location of the interrupt pointer (as configured above), calls the write DMA complete subroutine (FIG. 13), and the DTE write subroutine is complete, return step 715.

Figure 13:
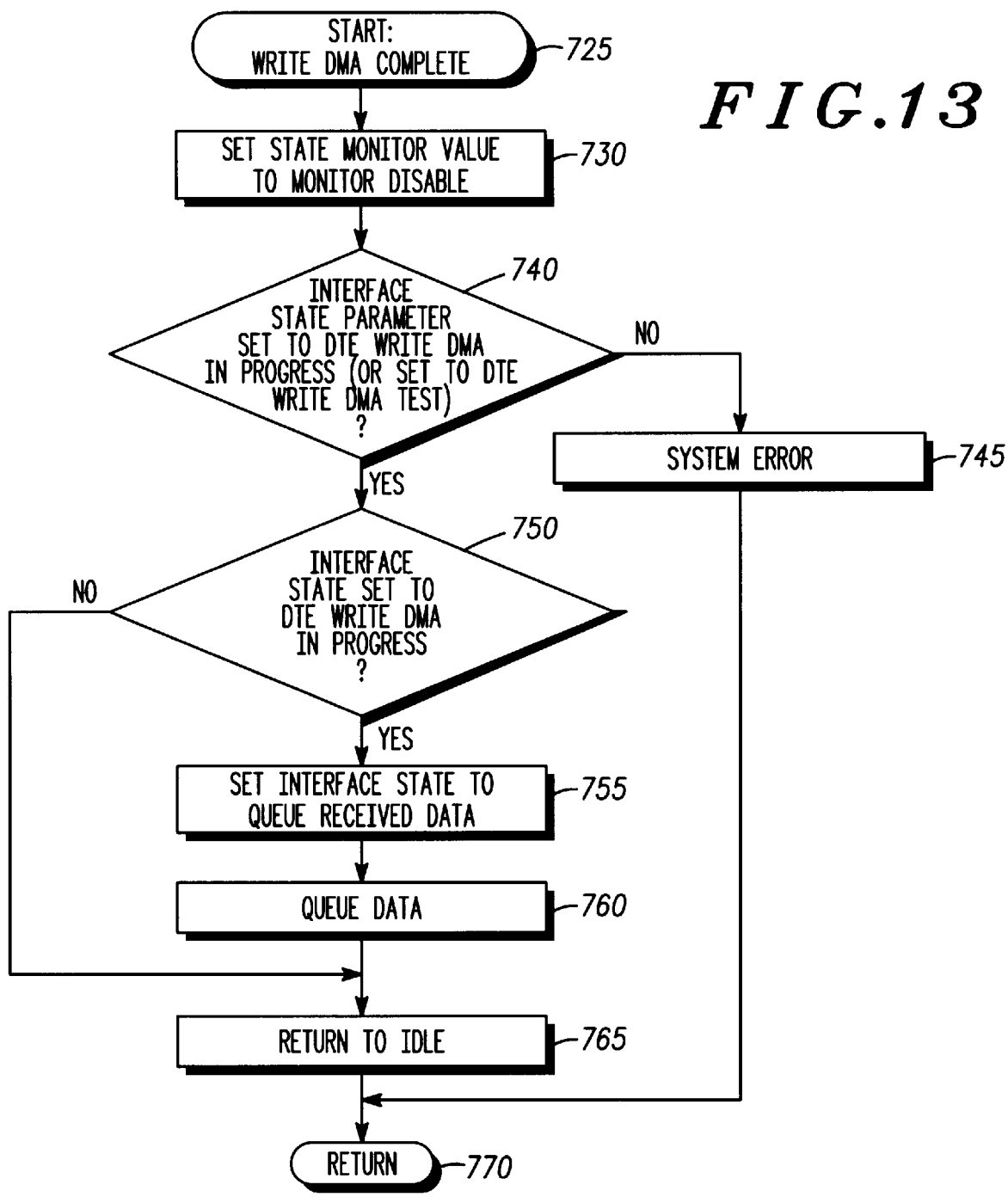
FIG. 13 is a flow diagram illustrating the write DMA complete subroutine in accordance with the present invention.
Figure 14:
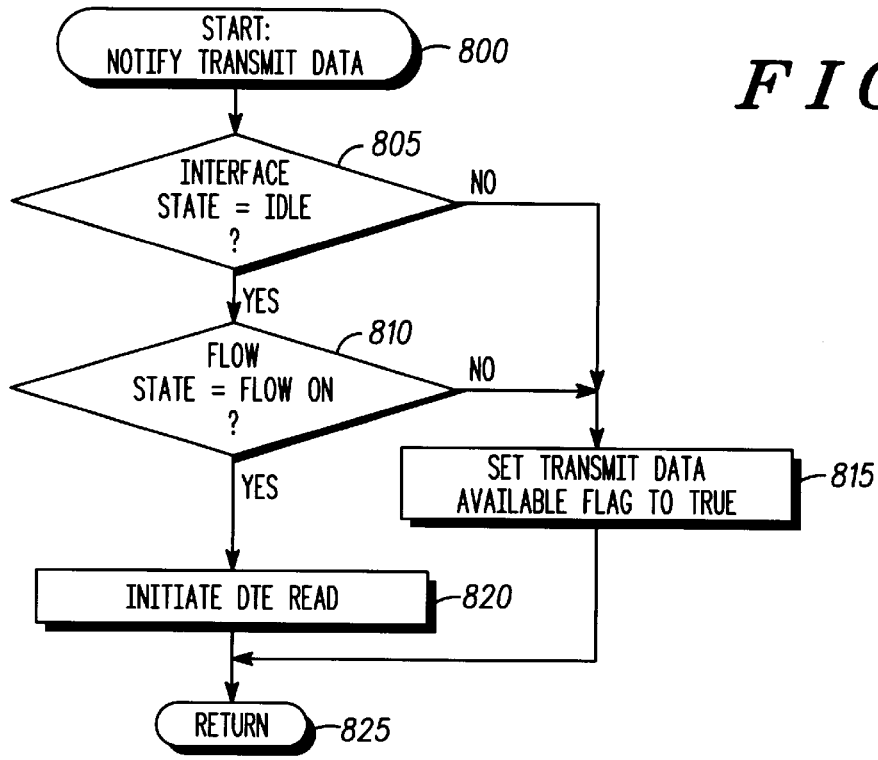
FIG. 14 is a flow diagram illustrating a notify transmit data routine in accordance with the present invention.

FIG. 13 is a flow diagram illustrating the write DMA complete subroutine, which is called at the end of step 710 illustrated in FIG. 12, by the generation of an interrupt signal from the DMA controller 240 upon 25 completion of the data transfer. The write DMA complete subroutine primarily functions to queue data for transmission over the communications channel 106 and determine if the interface 202 should return to idle. Referring to FIG. 13, beginning with start step 725, the state monitor parameter, if or having been previously set to monitor timeout (step 566, FIG. 8), is reset to monitor disable, as a timeout period may no longer be needed, step 730. Next, in step 740, if the interface state parameter is not set to DTE write DMA in progress (or DTE write DMA test), then an error has occurred, and a system error notification may be provided, step 745. In steps 740 and 750, if the interface state parameter is not set to DTE write DMA in progress, indicating that the interface state parameter is set to DTE write DMA test, then nothing further needs to be performed, and the processor 210 may determine if it should return to idle, step 765. In steps 740 and 750, if the interface state parameter is set to DTE write DMA in progress, then the interface state parameter is reset to queue received data, step 755. Data is then queued for transmission over the communications channel 106 to the network 104, step 760, and the processor 210 may determine if the interface 202 should return to idle, step 765 (illustrated in greater detail below with reference to FIG. 18), and the write DMA complete subroutine is complete, return step 770.

Conversely, the data communications device 201 may receive data over the communications channel 106 from the network 104, which the data communications device 201 will transfer to the DTE 200 via the interface 202, utilizing a DTE read operation (in which the DTE 200 will read the data transferred to the interface 202). Such a read operation, in which the data communications device 201 transfers data to the interface 202 for subsequent reading by the DTE 200, is illustrated in the flow diagrams of FIGS. 14 through 17. The read operation may commence when the data communications device 201 has received data over the communications channel which is queued for tranfer to the DTE 200. The read operation routines may be called during the return to idle routine (illustrated in greater detail below with reference to FIG. 18), or during the notify transmit data routine illustrated in the flow diagram of FIG. 14. Referring to the notify transmit data routine of FIG. 14, beginning with start step 800, the processor determines whether the interface state parameter is in an idle state, step 805, and whether the flow control parameter is set to flow on, step 810. If in step 805 the interface state parameter is in an idle state, indicating that the interface 202 is not being utilized for another activity, and if in step 810 the flow control parameter is set to flow on, indicating that the DTE 200 is able to receive data (for example, has sufficient memory available), then the processor 210 initiates a DTE read operation, step 820. In steps 805 or 810, if either the interface state is not idle or the flow state is not set to flow on, then in step 815, the transmit data available flag is set to true, and the notify transmit data routine is complete, return step 825. When the transmit data available flag is set to true, the data will be read subsequently, with the DTE read operation called from the return to idle routine illustrated in greater detail below (FIG. 18, steps 965, 970 and 975). In the preferred embodiment, interrupts are disabled at the beginning of the notify transmit data routine (before step 805), followed by re-enabling the interrupts at the end of the notify transmit data routine (following steps 815 and 820).

Figure 15:
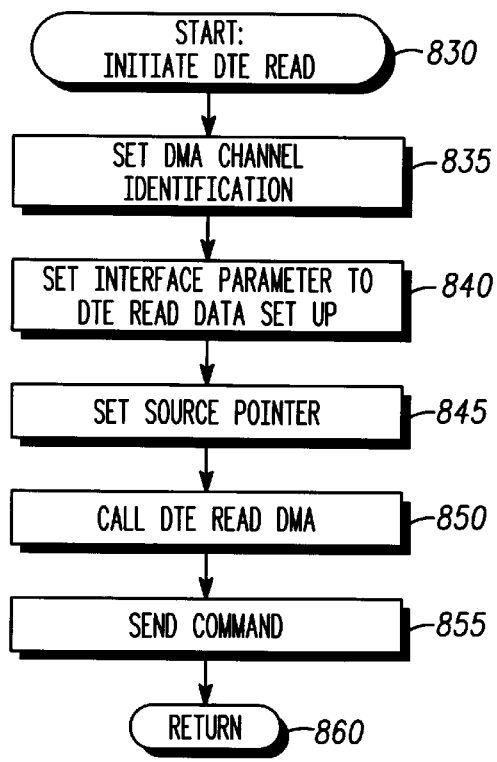
FIG. 15 is a flow diagram illustrating the initiate a DTE read subroutine in accordance with the present invention.

FIG. 15 is a flow diagram illustrating the initiate a DTE read subroutine, which may be called in the notify transmit data routine (step 820, FIG. 14), or from the return to idle routine (step 975, FIG. 18). Referring to FIG. 15, beginning with start step 830, the DMA channel identification is set (to a particular interface channel, if any), step 835. The interface state parameter is set to DTE read data set up, step 840, and the source pointer is set to the data queue (memory buffers (of memory 211) temporarily storing incoming data from the communications channel 106), step 845. The DTE read DMA subroutine (illustrated in FIG. 16) is called, with parameters of the source pointer and the length of the incoming data block, step 850, followed by a send command, step 855, with a command to the DTE to read incoming data, and a next state set to wait for the DTE to receive the read command, and the initiate a DTE read subroutine is complete, return step 860.

Figure 16:
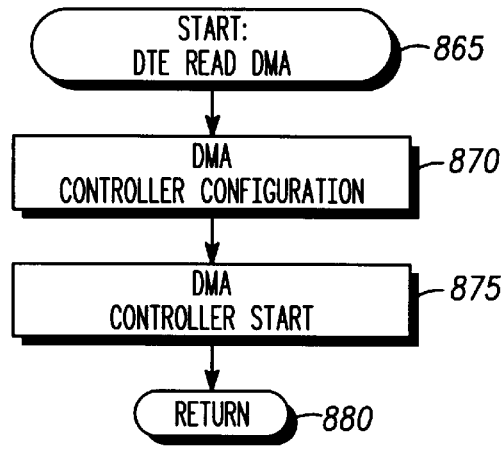
FIG. 16 is a flow diagram illustrating the DTE read DMA subroutine in accordance with the present invention.

FIG. 16 illustrates the DTE read DMA subroutine, called in step 850 of the initiate DTE read subroutine illustrated in FIG. 15. Referring to FIG. 16, following start step 865, the processor 210 configures the DMA controller 240 for transferring data from the data queue (memory buffers) to the interface 202 (via the transceiver 206) for reading by the DTE 200, step 870. In the preferred embodiment, the DMA controller is configured with (1) a source pointer equal to the address of the data queue location in memory 211, which is incremented for each read operation cycle; (2) source and destination data sizes equal to one word (16 bits); (3) a destination pointer address corresponding to the address of the data register 373 of the interface 202 or, equivalently, the address of the transceiver 206 (and which destination pointer is not incremented, such that the DMA controller 240 effectively treats the interface 202 (or transceiver 206) equivalently to a memory location); (4) a byte count equal to the block length of the data to be read by the DTE 200; (5) an interrupt pointer equal to the memory address of a read DMA complete subroutine (discussed below with reference to FIG. 17); and (6) an interrupt mode set to generate an interrupt to the processor 210 when the DMA controller 240 has completed the data transfer. Next, in step 875, the processor 210 starts the DMA controller 240, such that every time the DTE 200 reads one word of data from the interface 202, the DMA controller 240 places another data word on the interface 202 from the next location in memory 211 (from the location indicated by the source pointer, which is subsequently incremented (for the next data word)). As illustrated above in FIG. 8, this process is performed as a secondary interrupt service routine (steps 570, 572 and 574), such that once the DTE 200 has read the read command (step 855 illustrated in FIG. 15), the DTE 200 generates a secondary interrupt and the interface state is set to DTE read DMA in progress. Having been configured with information concerning the number of bytes to be transferred, once the transfer has been completed, the DMA controller 240 generates an interrupt which, utilizing the address location of the interrupt pointer (as configured above), calls the read DMA complete subroutine (FIG. 17), and the DTE read subroutine is complete, return step 880.

Figure 17:
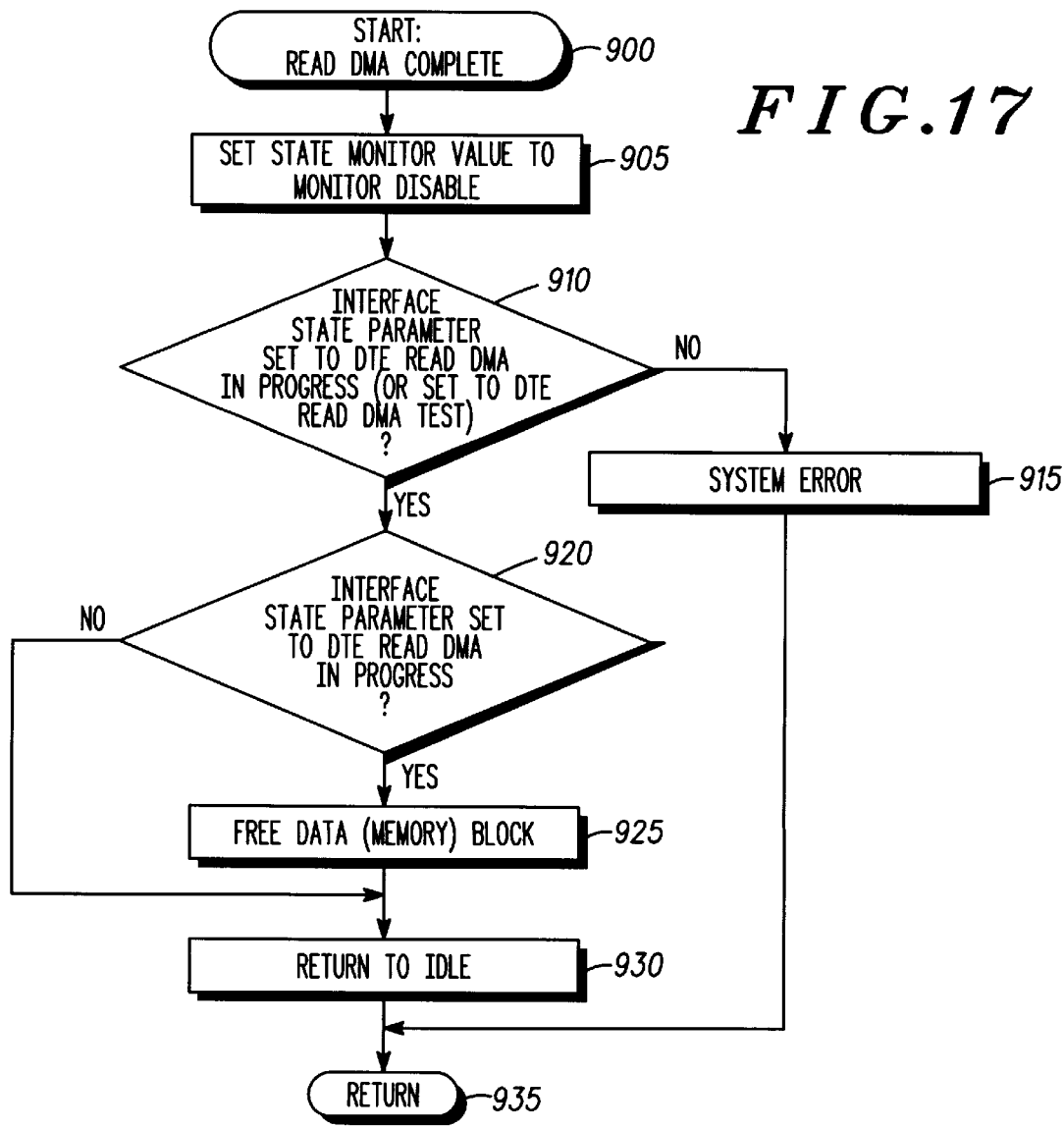
FIG. 17 is a flow diagram illustrating the read DMA complete subroutine in accordance with the present invention.
Figure 18:
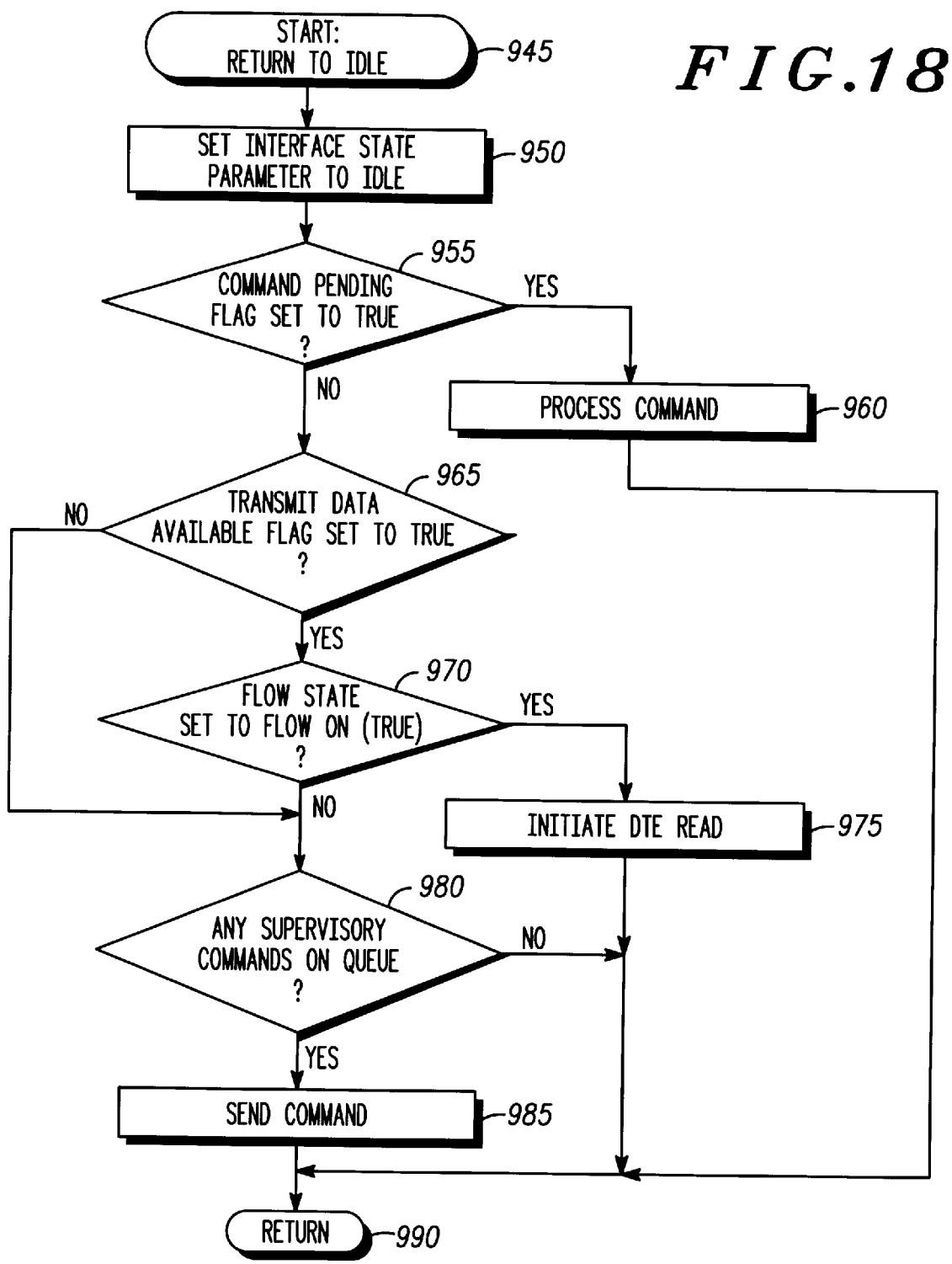
FIG. 18 is a flow diagram illustrating the return to idle procedures in accordance with the present invention.

FIG. 17 is a flow diagram illustrating the read DMA complete subroutine, which is called at the end of step 875 illustrated in FIG. 16, by the generation of an interrupt signal from the DMA controller 240 upon completion of the data transfer. The read DMA complete subroutine primarily functions to free up the block of memory 211 which had stored (queued) the data received over the communications channel 106 and to determine if the interface 202 should return to idle. Referring to FIG. 17, beginning with start step 900, the state monitor parameter, if or having been previously set to monitor timeout (step 572, FIG. 8), is reset to monitor disable, as a timeout period may no longer be needed, step 905. Next, in step 910, if the interface state parameter is not set to DTE read DMA in progress (or DTE read DMA test), then an error has occurred, and a system error notification may be provided, step 915. In steps 910 and 920, if the interface state parameter is not set to DTE read DMA in progress, indicating that the interface state parameter is set to DTE read DMA test, then nothing further needs to be performed, and the processor 210 may determine if it should return to idle, step 930. In steps 910 and 920, if the interface state parameter is set to DTE read DMA in progress, then the block of memory 211 which had stored (queued) the data received over the communications channel 106 is freed for future use, step 925, and the processor 210 may determine if it should return to idle, step 930 (illustrated in greater detail below with reference to FIG. 18), and the read DMA complete subroutine is complete, return step 935.

FIG. 18 is a flow diagram illustrating the return to idle procedure in accordance with the present invention. Rather than having the interface 202 return to idle following a read, write, or process command procedure, in the preferred embodiment, the processor 210 will determine, prior to returning the interface 202 to idle, whether another command is pending (and if so, will process the command) or whether additional data has been received from the network 104 (and if so, will transfer the data to the DTE 200). Referring to FIG. 18, beginning with start step 945, the processor 210 sets the interface state parameter to idle, step 950. In the event that a command or transmit data is available to be processed (steps 960 and 975 discussed below), the interface state will be reset to a corresponding non-idle state, such as DTE read DMA in progress, and if neither a command nor data is to be processed, the interface state will remain idle. Next, in step 955, the processor 210 determines whether the command pending flag is set to true, indicating that a command is waiting to be processed, and if so, processes the command, step 960 (returning to the process command routine illustrated above with reference to FIG. 9). When the command pending flag is not set to true in step 955, then the processor 210 determines whether the transmit data available flag is set to true, step 965, indicating that data has been received from the network 104 and should be transferred to the DTE 200. If in step 965 the transmit data available flag is set to true, and the flow state parameter is set to flow on in step 970, indicating that the DTE 200 is able to accept the received data, then the processor 210 initiates the DTE read procedure, step 975 (returning to step 830, FIG. 15). In the preferred embodiment, in which logical channels are multiplexed and identified by a channel number (or identification), each channel is searched to determine whether the transmit data available flag is set to true for that particular logical channel. If the transmit data available flag is not set to true (for any channel) in step 965, or if the flow state is not set to flow on in step 970, then the processor determines if any supervisory commands have been queued, awaiting processing, step 980. If in step 980 a supervisory command is queued, then the processor generates a send command, with the parameters of the send command specifying the supervisory command which had been queued, and a next state indicating to wait for the DTE to receive the supervisory command, step 985 (returning to step 630, FIG. 10), and the return to idle procedure is complete, return step 990.

Not specifically illustrated as routines or subroutines in the various diagrams, the preferred embodiment of the present invention may also provide for various other features. These features may include functions such as queuing supervisory commands, resetting (or clearing) the interface 202 and corresponding memory buffers (data queues), state monitoring functions, and timeout functions.

In summary, the various diagrams 2–18 disclose an apparatus 201 for data transfer across or over a first interface 202, the first interface 20 connected to data terminal equipment 200, and the apparatus 201 coupleable to a communications channel 106 and to the first interface 202 for data transfer between the communications channel 106 and the data terminal equipment 200. The apparatus then comprises: a transceiver 206 coupleable to the first interface 202 to transfer data to and from the first interface 202; a second interface 218 coupleable to the communications channel 106 to receive data from the communications channel 106 and to transmit data over the communications channel 106; a memory 211 for storage of data; and a processor 210 connected to the transceiver 206, to the second interface 218 and to the memory 211, the processor 210 responsive through a set of program instructions to receive an interrupt signal and, when the interrupt signal indicates a write command, to transfer data via the transceiver 206 from the first interface 202 to the memory 211 for transmission over the communications channel 106 via the second interface 218, and when the interrupt signal indicates data received from the communications channel 106, the processor 210 further responsive to generate a read command and transfer data from the memory 211 to the first interface 202 via the transceiver 206. In addition, the processor 210 is further responsive, when the data communications device 201 is initially powered on, to initialize a plurality of interface state parameters and enter an idle state (steps 305 and 310), and following processing of a command, the processor is further responsive to determine whether there is another command pending prior to returning to an idle state (step 365 and FIG. 18). Lastly in summary, the processor is further responsive to configure the direct memory access controller 240 with a first address corresponding to the transceiver in conjunction with the first interface, and with a second, variable pointer address corresponding to a location in the memory (FIGS. 11 and 15), and when the interrupt signal indicates a write command, to transfer data from the first address to a location in the memory indicated by the second, variable pointer address (FIGS. 12 and 13), and when the interrupt signal indicates a read command, to transfer data from a location in the memory indicated by the second, variable pointer address to the first address (FIGS. 14–17).

From the above discussion, numerous advantages of the apparatus and method of the present invention are apparant. First and foremost, the apparatus and method of the present invention enable high speed data transfer over an interface, such as an ISA or PCMCIA bus, heretofore unavailable. The apparatus and method of the present invention also avoid the limitations of the UARTs utilized in the prior art, with their inherent speed limitations. Lastly, the apparatus and method of the present invention may be implemented utilizing comparatively low cost components, and are compatible with existing operating systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for data transfer over an interface, the interface including a processor and connected to data terminal equipment, a data communications device coupleable to a communications channel and to the interface for data transfer between the communications channel and the data terminal equipment, the method comprising;

(a) receiving a non-markable interrupt signal;

(b) when the interrupt signal indicates a write command from the data terminal equipment, transferring data from the interface to a memory for transmission over the communications channel; and (c) when the interrupt signal indicates data received from the communications channel, generating a read command to the data terminal equipment and transferring data from the memory to the data terminal equipment via the interface.

2. The method of claim 1, further comprising:

when the interrupt signal indicates a supervisory command from the data terminal equipment, processing the supervisory command and transmitting an acknowledgement signal to the data terminal equipment via the interface.

3. The method of claim 1, further comprising:

determining whether there is a pending command prior to returning to an idle state.

4. The method of claim 1, further comprising:
when the data communications device is initially powered on, initializing a plurality of interface state parameters and entering an idle state prior to step (a).

5. The method of claim 4, further comprising:
exiting the idle state upon reception of the interrupt signal in step (a).

6. The method of claim 1, further comprising:
assigning a first address to the interface and a second, variable pointer address to the memory.

7. The method of claim 6, wherein step (b) further comprises:
transferring data from the first address to a location in the memory indicated by the second, variable pointer address.

8. The method of claim 6, wherein step (c) further comprises:
transferring data to the first address from a location in the memory indicated by the second, variable pointer address.

9. The method of claim 1, further comprising:
configuring a direct memory access controller with a first address corresponding to the interface and with a second, variable pointer address corresponding to a location in the memory.

10. The method of claim 9, wherein steps (b) and (c) further comprise:
transferring data between the first address and the location in memory indicated by the second, variable pointer address.

11. The method of claim 1, wherein step (b) further comprises:
setting an interface state parameter of a plurality of interface state parameters to indicate a write operation in progress.

12. The method of claim 1, wherein step (c) further comprises:
setting an interface state parameter of a plurality of interface state parameters to indicate a read operation in progress.

13. The method of claim 1 wherein steps (b) and (c) occur during a secondary interrupt service routine.

14. An apparatus for data transfer across a first interface, the first interface connected to data terminal equipment, the apparatus coupleable to a communications channel and to the first interface for data transfer between the communications channel and the data terminal equipment, the apparatus comprising:
a transceiver coupleable to the first interface to transfer data to and from the first interface;
a second interface coupleable to the communications channel to receive data from the communications channel and to transmit data over the communications channel;
a memory for storage of data; and
a processor connected to the transceiver, to the second interface and to the memory, the processor responsive through a set of program instructions to receive a non-maskable interrupt signal and, when the interrupt signal indicates a write command, to transfer data via the transceiver from the first interface to the memory for transmission over the communications channel via the second interface, and when the interrupt signal indicates data received from the communications channel, the processor further responsive to generate a read command and transfer data from the memory to the first interface via the transceiver.

15. The apparatus of claim 14, wherein the processor is further responsive, when the interrupt signal indicates a supervisory command from the data terminal equipment, to process the supervisory command and transmit an acknowledgement signal to the data terminal equipment via the first interface.

16. The apparatus of claim 14, wherein the processor is further responsive to determine whether there is a pending command prior to returning the first interface to an idle state.

17. The apparatus of claim 14, wherein the processor is further responsive, when the data communications device is initially powered on, to initialize a plurality of interface state parameters and place the first interface in an idle state.

18. The apparatus of claim 17, wherein the processor is further responsive to transition the first interface from the idle state upon reception of the interrupt signal.

19. The apparatus of claim 14, wherein the processor is further responsive to assign a first address to the transceiver in conjunction with the first interface, and assign a second, variable pointer address to the memory.

20. The apparatus of claim 19, wherein the processor is further responsive, when the interrupt signal indicates a write command, to transfer data from the first address to a location in the memory indicated by the second, variable pointer address.

21. The apparatus of claim 19, wherein the processor is further responsive, when the interrupt signal indicates a read command, to transfer data to the first address from a location in the memory indicated by the second, variable pointer address.

22. The apparatus of claim 14, wherein the processor is further responsive to configure a direct memory access controller with a first address corresponding to the transceiver in conjunction with the first interface, and with a second, variable pointer address corresponding to a location in the memory.

23. The apparatus of claim 14, wherein the processor is further responsive, when the interrupt signal indicates the write command, to set an interface state parameter of a plurality of interface state parameters to indicate a write operation in progress.

24. The apparatus of claim 14, wherein the processor is further responsive, when the interrupt signal indicates the read command, to set an interface state parameter of a plurality of interface state parameters to indicate a read operation in progress.

25. The apparatus of claim 14, wherein the interrupt signal is non-maskable.

26. The apparatus of claim 14, wherein the processor is further responsive to transfer data between the memory and the transceiver during a secondary interrupt service routine.

27. The apparatus of claim 14, wherein the processor is further responsive to monitor a plurality of interface state parameters.

28. The apparatus of claim 27, wherein the processor is further responsive to periodically monitor the plurality of interface state parameters to determine whether data has been received from the communications channel for transfer to the data terminal equipment.

29. The apparatus of claim 14, wherein the transceiver is a parallel transceiver having a multiple bit capacity corresponding to a bit capacity of the first interface.

30. An apparatus for data transfer across a first interface, the first interface connected to data terminal equipment, the apparatus coupleable to a communications channel and to the first interface for data transfer between the communications channel and the data terminal equipment, the apparatus comprising:

a transceiver coupleable to the first interface to transfer data to and from the first interface;

a second interface coupleable to the communications channel to receive data from the communications channel to form received data and to transmit transmissible data over the communications channel;

a memory for storage of received data and transmissible data; and a processor connected to the transceiver, to the second interface and to the memory, the processor further having a direct memory access controller, the processor responsive through a set of program instructions to monitor a plurality of interface state parameters and to receive an interrupt signal and, during a secondary interrupt service routine, to configure the direct memory access controller with a first address corresponding to the transceiver in conjunction with the first interface and to configure the direct memory access controller with a second, variable pointer address corresponding to a location in the memory; the processor further responsive, when the interrupt signal indicates a read command of a plurality of commands, via the direct memory access controller, to transfer the received data from the location in the memory corresponding to the second, variable pointer address, to the first address for data transfer over the first interface to the data terminal equipment, and to set a first interface state parameter of the plurality of interface state parameters to indicate a read operation in progress; the processor further responsive, when the interrupt signal indicates a write command of the plurality of commands, via the direct memory access controller, to transfer data from the first address to the memory location corresponding to the second, variable pointer address, to form the transmissible data, and to set a second interface state parameter of the plurality of interface state parameters to indicate a write operation in progress; the processor further responsive, when the interrupt signal indicates a supervisory command of the plurality of commands, to process the supervisory command and transmit an acknowledgement signal to the data terminal equipment via the transceiver and the first interface; and the processor further responsive to determine whether there is a pending command of the plurality of commands prior to returning the first interface to an idle state.

31. A method for data transfer over an interface, the interface including a processor and connected to data terminal equipment, a data communications device coupleable to a communications channel and to the interface for data transfer between the communications channel and the data terminal equipment, the method comprising:

(a) receiving an interrupt signal;

(b) when the interrupt signal indicates a write command from the data terminal equipment, transferring data from the interface to a memory for transmission over the communications channel; and (c) when the interrupt signal indicates data received from the communications channel, generating a read command to the data terminal equipment and transferring data from the memory to the data terminal equipment via the interface (d) monitoring a plurality of interface state parameters wherein the plurality of interface state parameters are periodically monitored to determine whether data has been received from the communications channel for transfer to the data terminal equipment.

32. An apparatus for data transfer across a first interface, the first interface connected to data terminal equipment, the apparatus coupleable to a communications channel and to the first interface for data transfer between the communications channel and the data terminal equipment, the apparatus comprising:

a transceiver coupleable to the first interface to transfer data to and from the first interface, wherein the transceiver is a parallel transceiver having a multiple bit capacity corresponding to a bit capacity of the first interface;

a second interface coupleable to the communications channel to receive data from the communications channel and to transmit data over the communications channel;

a memory for storage of data; and a processor connected to the transceiver, to the second interface and to the memory, the processor responsive through a set of program instructions to receive an interrupt signal and, when the interrupt signal indicates a write command, to transfer data via the transceiver from the first interface to the memory for transmission over the communications channel via the second interface, and when the interrupt signal indicates data received from the communications channel, the processor further responsive to generate a read command and transfer data from the memory to the first interface via the transceiver.

* * * * *